US005136308A

United States Patent [19]

Saito et al.

[11] Patent Number: 5,136,308

[45] Date of Patent: Aug. 4, 1992

[54] RECORDING APPARATUS

[75] Inventors: Yasuhide Saito, Urawa; Isao Tsukada, Yokohama, both of Japan

[73] Assignee: Canon Kabushiki Kaisha, Tokyo, Japan

[21] Appl. No.: 681,646

[22] Filed: Apr. 8, 1991

Related U.S. Application Data

[63] Continuation of Ser. No. 395,519, Aug. 18, 1989, abandoned.

[30] Foreign Application Priority Data

| | | | |
|---|---|---|---|
| Aug. 18, 1988 | [JP] | Japan | 1-211444 |
| Aug. 19, 1988 | [JP] | Japan | 63-204759 |
| Sep. 12, 1988 | [JP] | Japan | 63-226507 |
| Sep. 14, 1988 | [JP] | Japan | 63-230798 |
| Sep. 14, 1988 | [JP] | Japan | 63-230799 |

[51] Int. Cl.⁵ ........................ G01D 15/16; B41J 25/304

[52] U.S. Cl. ............................ 346/139 R; 346/139 A; 346/140 R; 400/185; 400/320

[58] Field of Search ........... 346/139 A, 139 R, 140 R; 400/185, 320, 314

[56] References Cited

U.S. PATENT DOCUMENTS 4,030,588 6/1977 Hawagata et al. .................. 400/120

4,752,786 6/1988 Inoue et al. ..................... 346/139 R 5,044,797 9/1991 Walker et al. .................. 400/320 X

OTHER PUBLICATIONS

Zell, M. N., Single Motor Drive, IBM Tech Disc Bull, vol. 26, No. 3B, Aug. 1983, 1677–78.

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A recording apparatus for performing recording on a recording medium includes a feed roller for feeding a recording medium, a recording head reciprocally movable along a feed path of the recording medium conveyed by the feed roller, the recording head being arranged to perform recording on the recording medium, a motor rotatable in a forward and a reverse direction, a first driving force transmitting unit for driving the feed roller upon rotation of the motor, and a second driving force transmitting unit capable of not receiving the driving force when the driving force is transmitted from the motor to the first driving force transmitting unit. The second driving force transmitting unit is arranged to reciprocate the recording head upon reversible rotation of the motor. A particularly configured drive belt with toothed and non-toothed portions accomplishes this operation.

20 Claims, 18 Drawing Sheets

RECORDING APPARATUS

This application is a continuation of application Ser. No. 07/395,519 filed Aug. 18, 1989, now abandoned.

BACKGROUND OF THE INVENTION

1. Field of the Invention

The present invention relates to a recording apparatus and, more particularly, to a so-called serial type recording apparatus for moving a recording means along a recording medium.

Recording apparatuses include a portable calculator, a portable electronic typewriter, a facsimile machine, a copying machine, and a printer. A recording means is exemplified by a system using a thermal recording type or scheme such as a thermal or heat transfer scheme, a system using an ink-jet recording scheme such as a bubble jet scheme, and a system using an impact recording scheme such as a daisy wheel or wire dot scheme.

2. Description of the Related Art

A recording apparatus using a disposable ink cartridge of a bubble jet scheme is exemplified as a conventional recording apparatus of this type, as shown in FIGS. 1 to 6.

The overall arrangement of the recording apparatus will be described with reference to FIGS. 1 and 2. A recording apparatus R includes a frame 1 as a housing. A base (to be referred to as a chassis hereinafter) 2 is fixed in the frame 1 to support a stepping motor 7 (to be described later), a pinch roller 3 in FIG. 2, and the like. A guide shaft 4 is fixed to the frame 1 at both its ends and movably guides a carriage 5. Part of a timing belt 6 is locked with the carriage 5, and the timing belt 6 is driven by the stepping motor 7. The carriage 5 and a recording head 8 mounted on the carriage 5 are driven by the timing belt 6 along a recording sheet 11 upon rotation of the timing belt 6 by a driving force of the stepping motor 7. Ink is discharged from the recording head 8 to record information on the recording sheet 11. A lever 8*a* is a head press/release lever.

A feed roller 9 feeds to a recording position the recording sheet 11 inserted from an insertion port 10 as shown in FIG. 2. An elastic body is mounted on the surface of the feed roller 9 to prevent slippage of the sheet. The feed roller 9 is also driven by the stepping motor 7 during sheet feeding in this embodiment. The sheet 11 is clamped between the feed roller 9 and the pinch roller 3 and is then fed. A platen 12 can hold the recording sheet 11 at the recording position. A flexible cable 13 supplies a recording signal to the recording head 8 mounted on the carriage 5. A home position sensor 14 senses the carriage 5 when the carriage 5 reaches the home position.

Driving systems of the timing belt 6 and the feed roller 9 upon driving of the stepping motor 7 will be described with reference to FIGS. 3 to 5.

Referring to FIGS. 3 and 4, a worm wheel 22 is fitted on a feed roller shaft 21 to rotate the feed roller shaft 21 only in one direction, as will be described later. An arbor 23 is fitted and fixed on the roller shaft 21. A spring clutch 24 is hooked between the arbor 23 and the worm wheel 22. One end of the spring clutch 24 is locked in a groove 22*a* of the worm wheel 22 and is rotated together with the worm wheel 22. When the worm wheel 22 is rotated by the stepping motor 7 in the E direction (during recording) shown in FIG. 4 in a manner to be described later, the spring of the spring clutch 24 is not engaged with the arbor 23, and the feed roller 9 and the roller shaft 21 are not rotated. Only when the worm wheel 22 is rotated in the F direction (during sheet feeding), the spring of the spring clutch 24 is engaged with the arbor 23, so that the feed roller 9 and the roller shaft 21 are rotated in the F direction.

Referring to FIG. 3, a belt driving pulley 25 is rotated by the stepping motor 7 to drive the timing belt 6. A worm gear 26 is rotated by the stepping motor 7 and is meshed with the worm wheel 22. The belt driving pulley 25 and the worm gear 26 are illustrated as if they overlap each other. However, the belt driving pulley 25 and the worm gear 26 are integrally mounted on the shaft of the stepping motor 7, as shown in FIG. 6. Therefore, the belt driving pulley 25 and the worm gear 26 can be simultaneously driven by the stepping motor 7.

A structure associated with the pinch roller 3 will be described with reference to FIGS. 2, 3, and 5. Referring to FIGS. 2, 3, and 5, a pinch roller shaft 31 is made of a conductive material in the same manner as the pinch roller 3. Both end portions of the pinch roller shaft 31 are held by guide grooves 1A of the frame 1. The roller shaft 31 is biased between both the end portions and the pinch roller 3 toward the feed roller 9 by a spring portion 32 extending from the chassis 2 of a conductive material toward the roller shaft 21.

An operation of the recording apparatus having the above structure will be described below.

Before the start of recording, a corner 5A of the carriage 5 shown in FIG. 4 abuts against the home position sensor 14 and is stopped upon detection of the stop state by the sensor 14. When a character-feed signal for moving the carriage 5 is supplied to the stepping motor 7 to perform recording, the motor 7 is rotated in a direction indicated by an arrow A (FIG. 4) to rotate the worm gear 26 together with the belt driving pulley 25. Although the worm wheel 22 is rotated in the E direction by the worm gear 26, as described above, the spring clutch 24 shown in FIG. 3 is disengaged from the arbor 23. The roller shaft 21 mounted with the arbor 23 is not rotated. Therefore, sheet feeding by the feed roller 9 is not performed.

Upon rotation of the belt driving pulley 25 in the A direction of FIG. 4, the carriage 5 is moved in a direction indicated by an arrow C. Meanwhile, an ink discharging signal is selectively supplied to the recording head 8 through a flexible cable 13 in synchronism with a character-feed signal input to the motor 7. When the ink supplied from an ink cartridge is discharged from the recording head 8, information is recorded on the recording sheet 11. The timing belt 6 is looped between the driving pulley 25 and idler pulleys 28A, 28B, and 28C.

When recording is completed, the stepping motor 7 is rotated in the reverse direction to cause the carriage 5 to return to the home position sensor 14, i.e., in the D direction. More specifically, the stepping motor 7 is rotated in the B direction to rotate the worm gear 26 and the belt driving pulley 25. Upon rotation of the worm gear 26 and the pulley 25, the worm wheel 22 is rotated in the F direction (FIG. 4). During rotation of the worm wheel 22 in the F direction, the spring clutch 24 shown in FIG. 3 is engaged with the arbor 23 to rotate the roller shaft 21 in the F direction. Therefore, the sheet 11 is fed by the feed roller 9. In other words, the sheet 11 is fed during returning of the carriage 5, i.e., during non-recording.

In the conventional recording apparatus described above, a sheet feed amount of each cycle is determined by a rotational amount (rotational angle) of the stepping motor 7, i.e., a rotational amount for returning the carriage 5. Even if recording with a full width is not performed, the carriage 5 must be moved to the left end of the frame 1 shown in FIG. 5, and the sheet 11 is fed during the return stroke of the carriage 5 to the home position.

When continuous sheet feed operation is required, recording is interrupted every one-character sheet feeding, and the carriage 5 must be moved to the left end of the frame 1. In addition, the sheet feed speed is not changed, and therefore the continuous sheet feed speed is undesirably low.

In sheet feeding for loading the recording sheet 11 in the recording apparatus R, the carriage 5 repeats reciprocal movement. If a liquid spray recording head such as an ink-jet or bubble jet recording head is used, an ink discharging surface of the head 8 is brought into contact with the leading end of the recording sheet 11 to contaminate the recording sheet 11. In addition, paper dust may be attached to the ink discharging surface, thus impairing the ink discharging function and recording quality.

SUMMARY OF THE INVENTION

It is an object of the present invention to provide a recording apparatus which does not impair recording quality.

It is another object of the present invention to provide a recording apparatus capable of continuously feeding a recording medium.

It is still another object of the present invention to provide a recording apparatus capable of feeding a recording medium without moving a carriage.

It is still another object of the present invention to provide a recording apparatus wherein a recording head does not interfere with a recording medium when the recording medium is fed during non-recording.

It is still another object of the present invention to provide a recording apparatus capable of continuously feeding a sheet at a high speed without an intermittent operation during continuous sheet feeding, and capable of preventing trouble caused by an interference between the recording head and the recording sheet since the recording head need not be moved by the carriage.

It is still another object of the present invention to provide a recording apparatus capable of preventing contact between the recording head and the recording medium and capable of increasing a sheet feed speed and adjusting a sheet feed amount.

It is still another object of the present invention to provide a recording apparatus having an arrangement wherein a plurality of grooves are formed to lock one end of a spring clutch rotated together with the spring clutch so as to hold the spring clutch for intermittently transmitting a driving force for feeding a recording medium during carriage movement, thereby changing a play amount of the spring clutch and hence keeping constant a change in sheet feed amount caused by a change in recording width without replacing the components of the apparatus.

BRIEF DESCRIPTION OF THE DRAWINGS

FIG. 18 is a flow chart for explaining an operation when a sheet detection switch is turned on;

DETAILED DESCRIPTION OF THE PREFERRED EMBODIMENTS

Preferred embodiments of the present invention will be described in detail with reference to the accompanying drawings.

Figure 7:
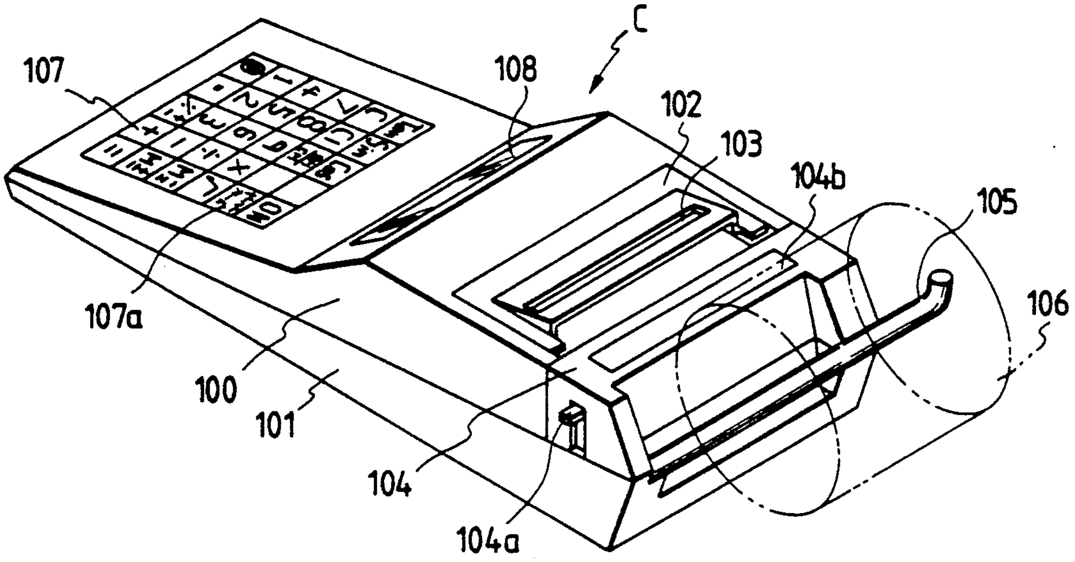
FIG. 7 is a perspective view showing an electronic portable calculator C as a recording apparatus according to an embodiment of the present invention.
Figure 8:
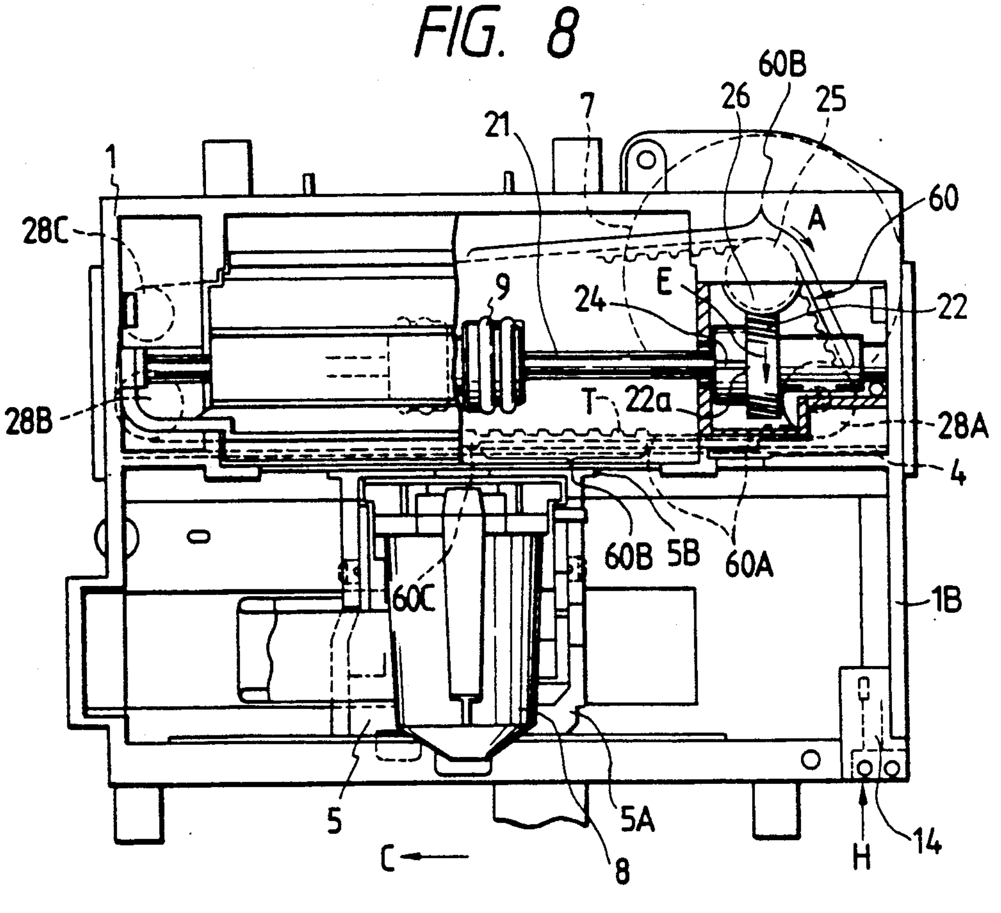
FIG. 8 is a plan view of a recording system incorporated in the electronic portable calculator C in a recording mode.
Figure 9:
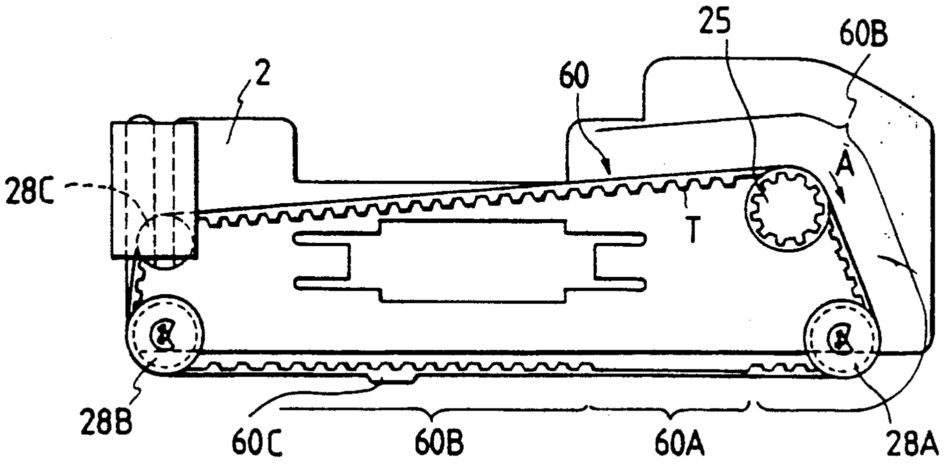
FIG. 9 is a plan view showing a timing belt extended portion shown in FIG. 8.
Figure 10:
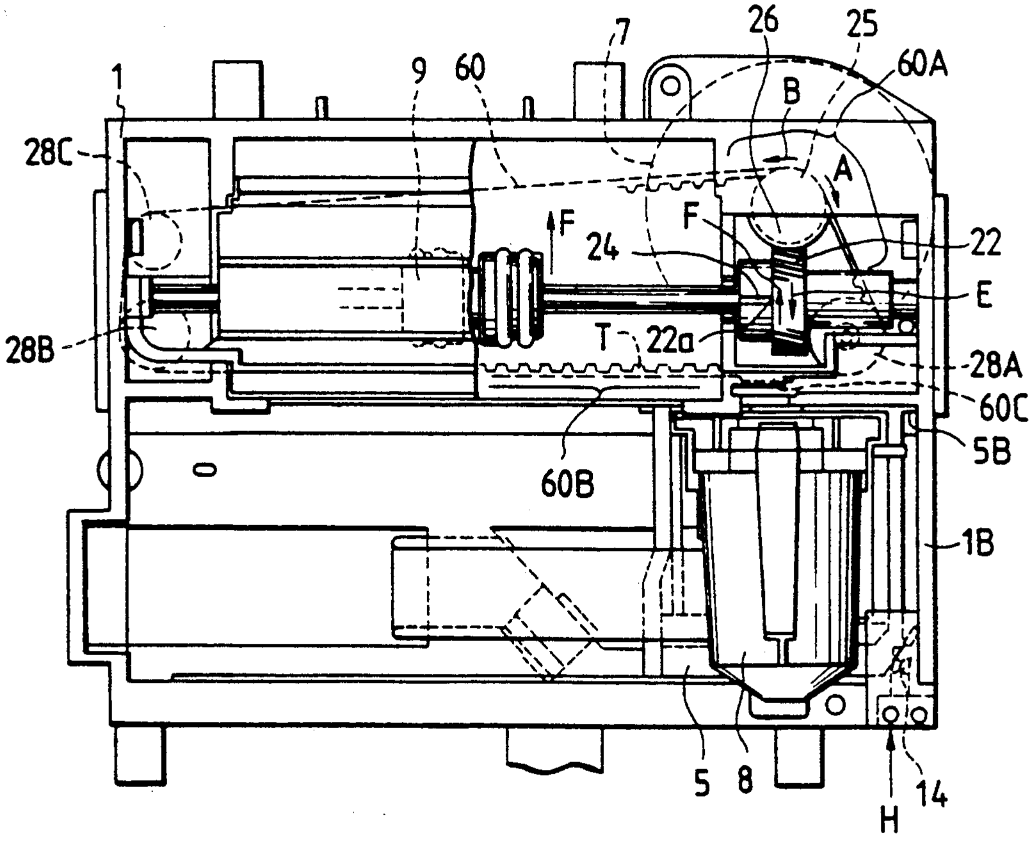
FIG. 10 is a plan view showing the recording system during recording sheet feeding.
Figure 11:
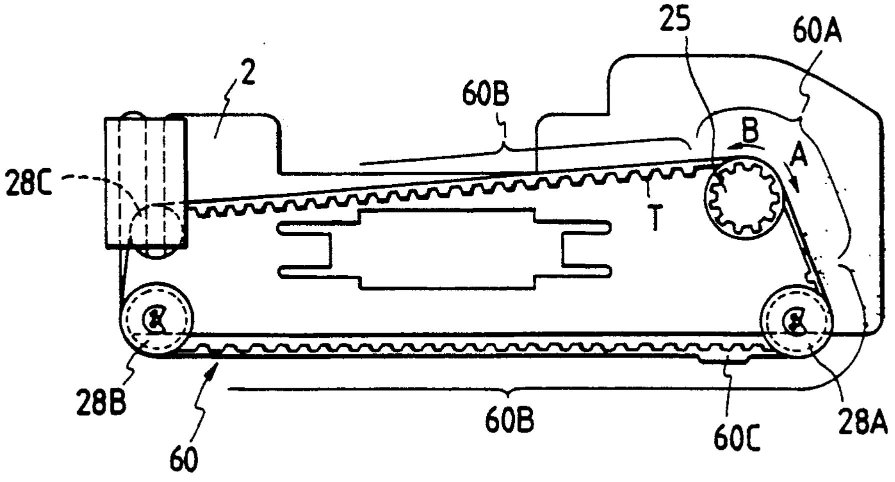
FIG. 11 is a plan view showing a timing belt extended portion shown in FIG. 10.
Figure 12:
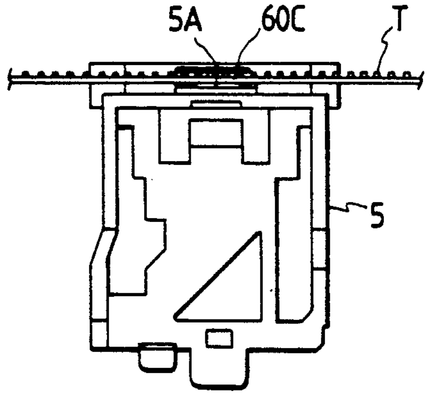
FIG. 12 is a plan view showing a carriage of the electronic portable calculator C.

FIG. 7 is a perspective view of an electronic portable calculator C as a recording apparatus according to an embodiment of the present invention. FIG. 8 is a plan view of a recording system or printer R incorporated in the electronic portable calculator C in a recording mode. FIG. 9 is a plan view of a timing belt extended portion shown in FIG. 8. FIG. 10 is a plan view showing the recording system R during recording sheet feeding. FIG. 11 is a plan view showing a timing belt extended portion shown in FIG. 10. FIG. 12 is a plan view of a carriage of this embodiment. The same reference numerals as in the prior art denote the same parts in FIGS. 8 to 12.

The electronic portable calculator C according to an embodiment of the present invention will be described with reference to FIG. 7.

Referring to FIG. 7, an upper case 100 and a lower case 101 constitute an outer case. A printer lid 102 is detachably mounted on the upper case 100. A recording head 8 or an ink liquid carriage can be removed from the upper case 100 when the recording head 8 or the ink liquid cartridge is replaced with a new one. A discharging port 103 is formed in the printer lid 102 to discharge a recorded recording sheet 11. A platen cover 104 is pivotally connected to the lower case 101. Upon depression of a lever **104*a*, the platen cover 104 is rotated clockwise together with a feed roller 9 and a platen 12, thereby releasing a recording sheet feed path. A rolled sheet supported by a roll sheet holder 105 is inserted in the recording section through a recording sheet insertion port 104*b*. A keyboard 107 has various input keys. An indicator 108** indicates input information and calculation results.

The recording system R which employs the present invention and is incorporated in the calculator C will be described below.

This embodiment exemplifies a recording apparatus wherein a carriage driving timing belt slips to continuously drive a feed roller so as to continuously feed a sheet and increase an operating speed during continuous sheet feeding when a carriage reaches a return limit position during returning of the carriage, i.e., during non-recording of the recording head.

FIGS. 8 to 13 show this embodiment. Referring to FIGS. 8 to 11, a timing belt 60 according to this embodiment includes a non-toothed portion 60A not having teeth T, a toothed portion 60B having teeth T, and a mounting positioning portion 60C for determining a mounting position on the carriage 5. The positioning portion 60C is positioned and mounted at a fixing portion 5A (FIG. 12) of the carriage 5, so that the carriage 5 can be reciprocated upon pivotal movement of the belt 60. The timing belt 60 in this embodiment has 99 teeth formed at equal intervals. Teeth are not formed at a portion corresponding to four teeth from the position corresponding to the 16th teeth from the head mounting central position, thereby constituting the non-toothed portion 60A.

FIGS. 8 and 9 show a position of the timing belt 60 in a normal recording operation. In this state, the toothed portion 60B of the timing belt 60 is meshed with a belt driving pulley 25. Therefore, the carriage 5 is moved in the C direction. Meanwhile, an ink liquid is discharged from the recording head 8 to record information on the recording sheet 11. A worm wheel 22 and the belt driving pulley 25 are rotated by a coaxial worm gear 26 in the E direction. As described with reference to the prior art, a clutch 24 incorporated in the worm wheel 22 is kept disengaged, and the feed roller 9 will not be rotated.

A continuous sheet feed mode will be described below.

FIGS. 10 and 11 show a state in a continuous sheet feed mode. In this state, the carriage 5 is moved to the right beyond a normal home position H to a position where the carriage 5 abuts against a right regulating wall 1B of the frame 1. In response to this movement, the non-toothed portion 60A of the timing belt 60 is guided to a position where the non-toothed portion 60A is in contact with the belt driving pulley 25. The belt driving pulley 25 is then rotated in the B direction. In this case, the belt driving pulley 25 is not kept meshed with the timing belt 60, so that the belt 60 slips. The carriage 5 is no longer moved in the D direction. Therefore, the timing belt 60 is kept stopped.

The worm gear 26 coaxial with the belt driving pulley 25 is rotated in the B direction, and then the worm wheel 22 is driven in the F direction. A clutch **22*a* in the worm wheel 22 is kept engaged, and the feed roller 9 is rotated in the same direction (i.e., the F direction). Therefore, the sheet 11** can be continuously fed.

In order to set a state wherein recording is performed again at the end of continuous sheet feeding, the belt driving pulley 25 is rotated by the stepping motor 7 in the A direction in the state shown in FIGS. 10 and 11. With this operation, the carriage 5 is separated from the regulating wall 1B, and the timing belt 60 is moved in the same direction while it is slipping. A meshing state between the belt 60 and the belt driving pulley 25 is restored. The carriage 5 can be moved in the C direction in the same manner as described above.

During continuous sheet feeding, since the timing belt 60 slips on the belt driving pulley 25, the contact surface of the non-toothed portion 60A must be sufficiently smooth. In addition, an anti-wear material must be used as a core material of the timing belt 60. Kevlar (tradename) or an equivalent material can be used as a core of a timing belt of this type.

Figure 13:
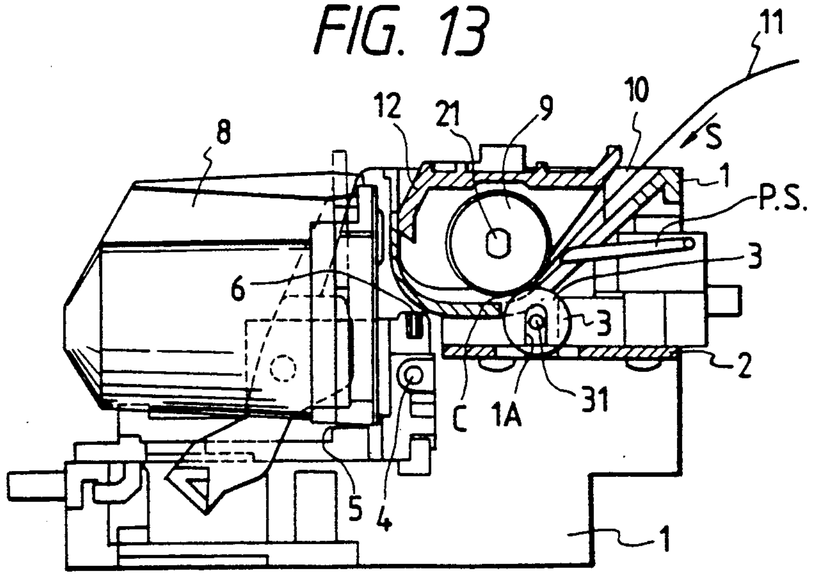
FIG. 13 is a side view showing the embodiment of FIG. 7.

A sheet detection switch P.S. is arranged in this embodiment, as shown in FIG. 13. The sheet detection switch P.S. is arranged on the upstream side of a contact portion C between a pinch roller 3 and the feed roller 9 with respect to the sheet insertion direction (S direction) to detect insertion of the sheet 11.

Various control operations of the electronic portable calculator will be described below.

Figure 14:
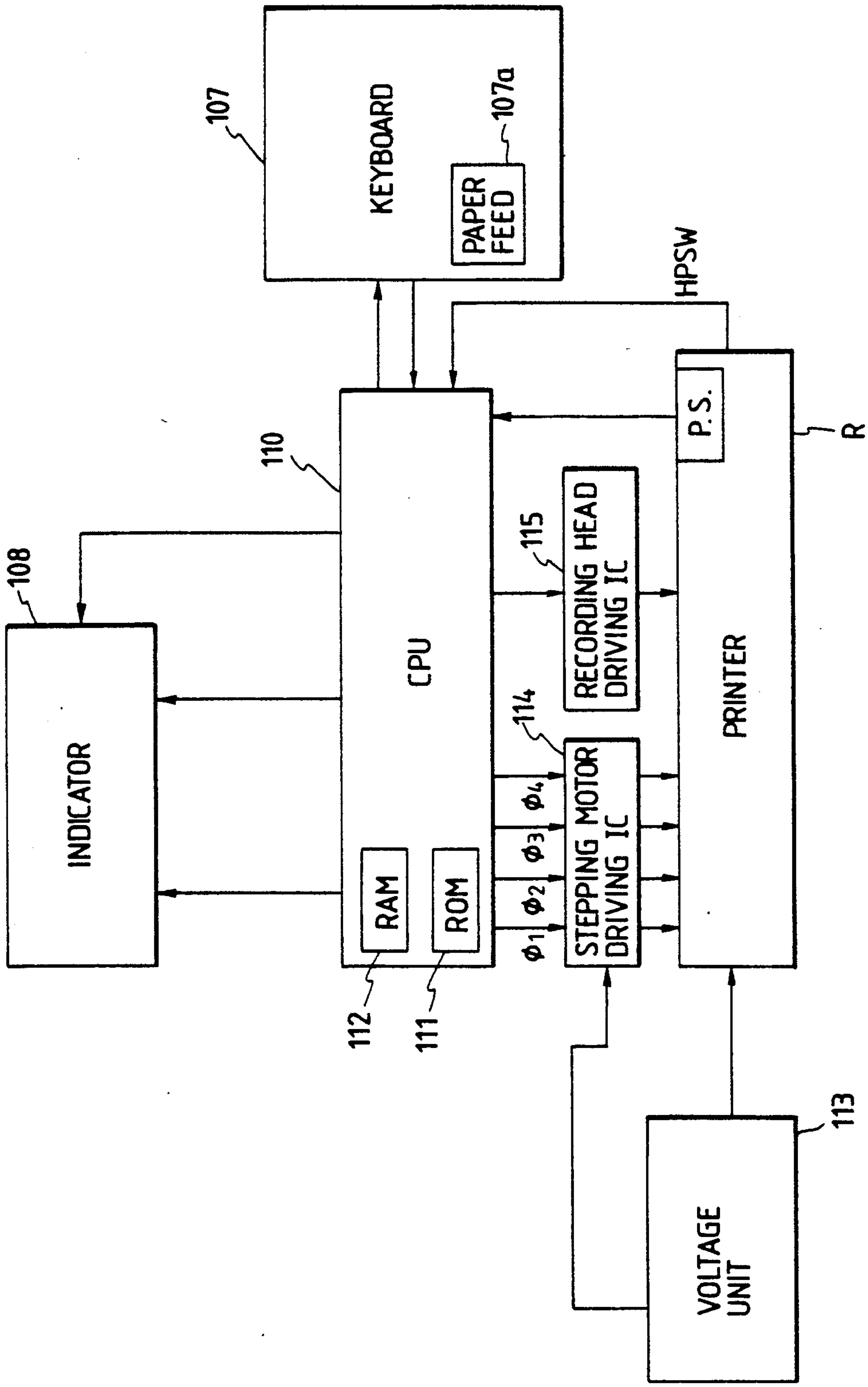
FIG. 14 is a block diagram of the electronic portable calculator of the embodiment shown in FIG. 7.

FIG. 14 is a block diagram of the electronic portable calculator C.

Referring to FIG. 14, the calculator C includes a CPU 110 for performing arithmetic operations in the calculator, and receiving signals from the keyboard 107, the recording system R, and the indicator 108 to control the respective circuit components. The CPU 110 includes a ROM 111 for storing processing sequences and a RAM 112 serving as a work area in processing. The electronic portable calculator C also includes a voltage unit 113, a stepping motor driving IC 114, and a recording head driving IC 115. A signal HPSW is used to determine a reference position of the carriage 5 upon detection of a signal from the home position sensor 14 arranged in the recording system R.

Figure 15:
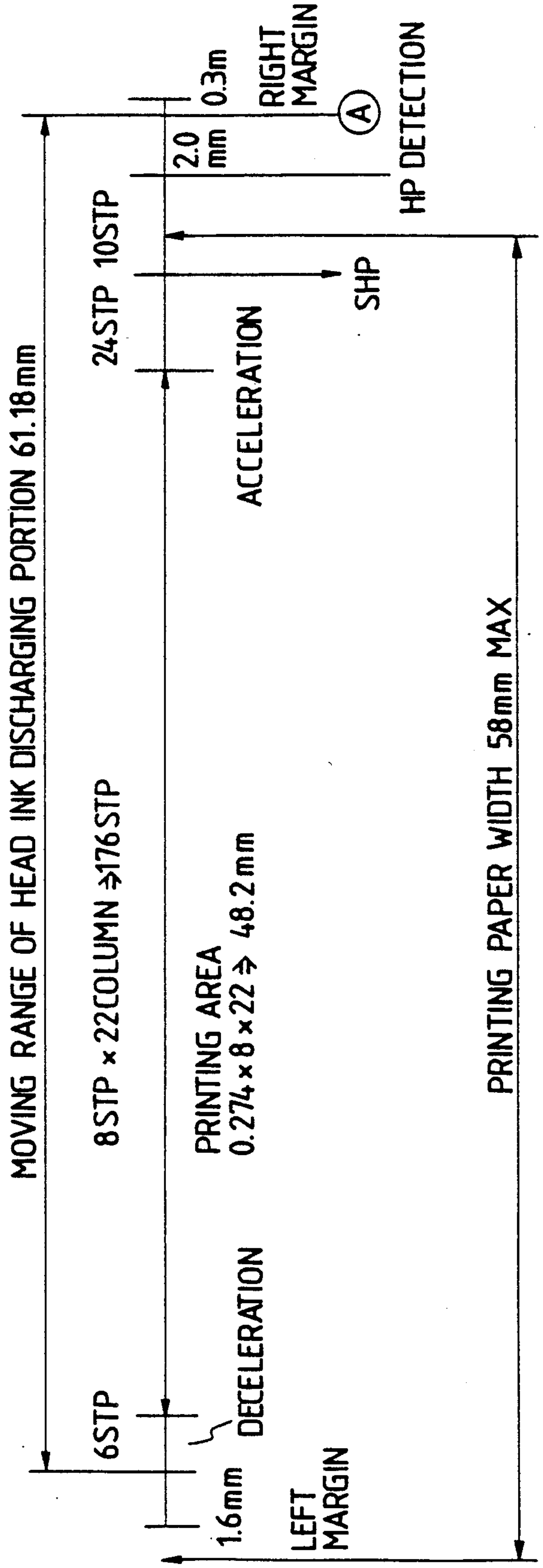
FIG. 15 is a view showing an operation range of the carriage of the embodiment shown in FIG. 7.

The operating range of the carriage 5 will be described with reference to FIG. 15.

As previously described, since the carriage 5 is driven by a driving force of the stepping motor 7, one-step rotation of the motor 7 corresponds to one-step movement of the carriage 5. In this embodiment, the carriage 5 can be moved by 0.274 mm upon one-step rotation (3.75°) of the motor 7. The carriage 5 is moved by 10 steps to the left upon detection by the right home position (HP) switch 14 and is stopped at a software home position (SHP). In the recording mode, the carriage 5 is accelerated to the left by 24 steps and is then moved by 176 steps at a constant step. During movement by 176 steps, the inks are discharged from the recording head 8 to record information on the recording sheet 11. Thereafter, the carriage 5 is decelerated by 6 steps. The motor 7 is then rotated in the reverse direction, so that the carriage 5 is stopped at the software home position SHP.

The timing belt 60 is disengaged from the belt driving pulley 25 at position (A) (FIG. 15) upon HP detection of the carriage and its further movement to the right. When the motor 7 is further rotated to move the carriage 5 to the right, the carriage 5 abuts against the regulating wall 1B of the frame 1, thereby feeding the recording sheet 11.

Figure 16:
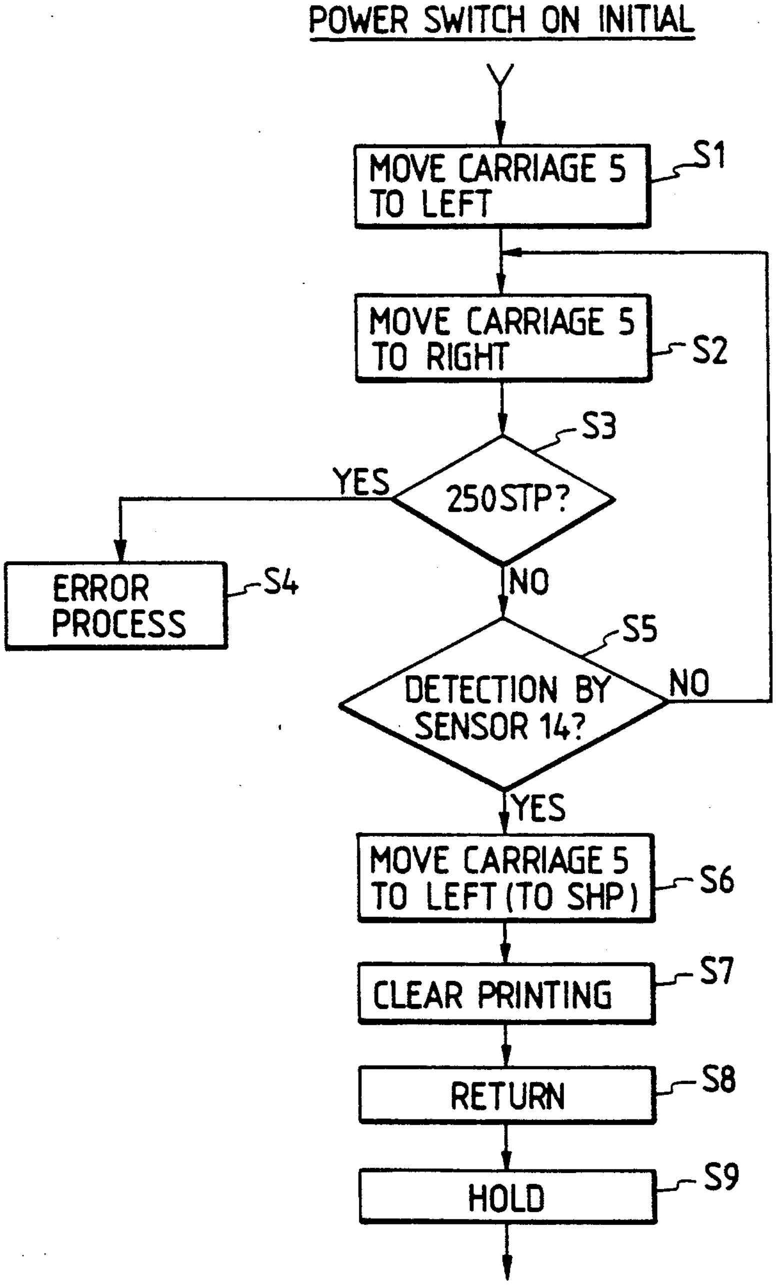
FIG. 16 is a flow chart for explaining an operation upon power-on in the embodiment shown in FIG. 7.

An operation at the time of power-on will be described with reference to a flow chart in FIG. 16.

Since it is also possible that the carriage 5 abuts against the right end 1B of the frame 1 and is kept stopped, the carriage 5 is moved to the left (step S1). The carriage 5 is then moved to the right to detect the home position (step S2). The CPU 110 determines in step S3 whether the moving amount exceeds 250 steps. If the home position sensor (HP) is not detected within 250 steps, an error is determined (step S4). However, if the home position sensor (HP) 14 is detected within 250 steps (step S5), the carriage 5 is moved to the left to the software home position (SHP) (step S6). Thereafter, the normal recording routine is executed. The carriage 5 records "CLEAR" while being moved to the left (step S7). When recording is completed, the carriage 5 returns to the right SHP (step S8) and is stopped thereat (step S9).

Figure 17:
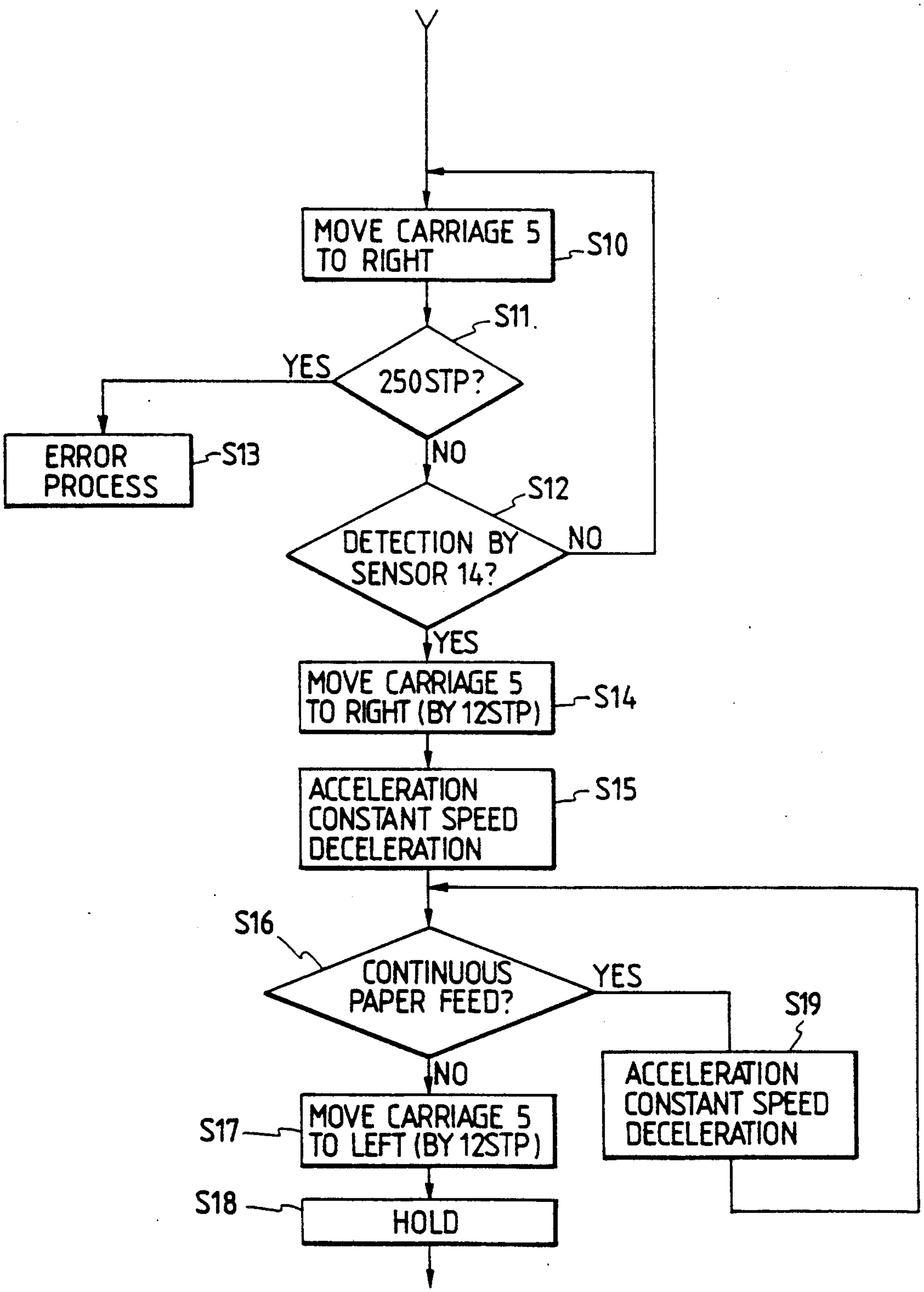
FIG. 17 is a flow chart for explaining a paper feed operation.

A paper feed operation upon selection of a paper feed key 107*a* arranged on the keyboard 107 will be described with reference to a flow chart in FIG. 17. When a paper feed signal is input, the carriage 5 is moved from the software home position SHP to the right (step S10). The CPU 110 determines in steps S11 and S12 whether the home position sensor is turned on within 250 steps. If the home position (HP) sensor 14 is not detected within 250 steps, an error is determined (step S13). When the home position (HP) sensor is turned on, the carriage 5 is further moved to the right by 12 steps (step S14). At this time, since the non-toothed portion 60A of the timing belt 60 opposes the pulley 25, the timing belt 60 is disengaged from the belt driving pulley 25. The motor 7 is driven to force the carriage 5 to move to the right, but the carriage 5 abuts against and is stopped at the regulating wall 1B of the frame 1. In this case, only the sheet 11 is fed upon rotation of the feed roller 9. When one-line sheet feed (step S15) is completed, the CPU 110 determines in step S16 whether the next paper feed signal is input. If NO in step S16, the carriage is moved to the left (step S17) and is stopped at the software home position SHP (step S18). However, if YES in step S16, the motor 7 is driven to further move the carriage 5 to the right, thereby feeding the sheet (step S19).

Figure 18:
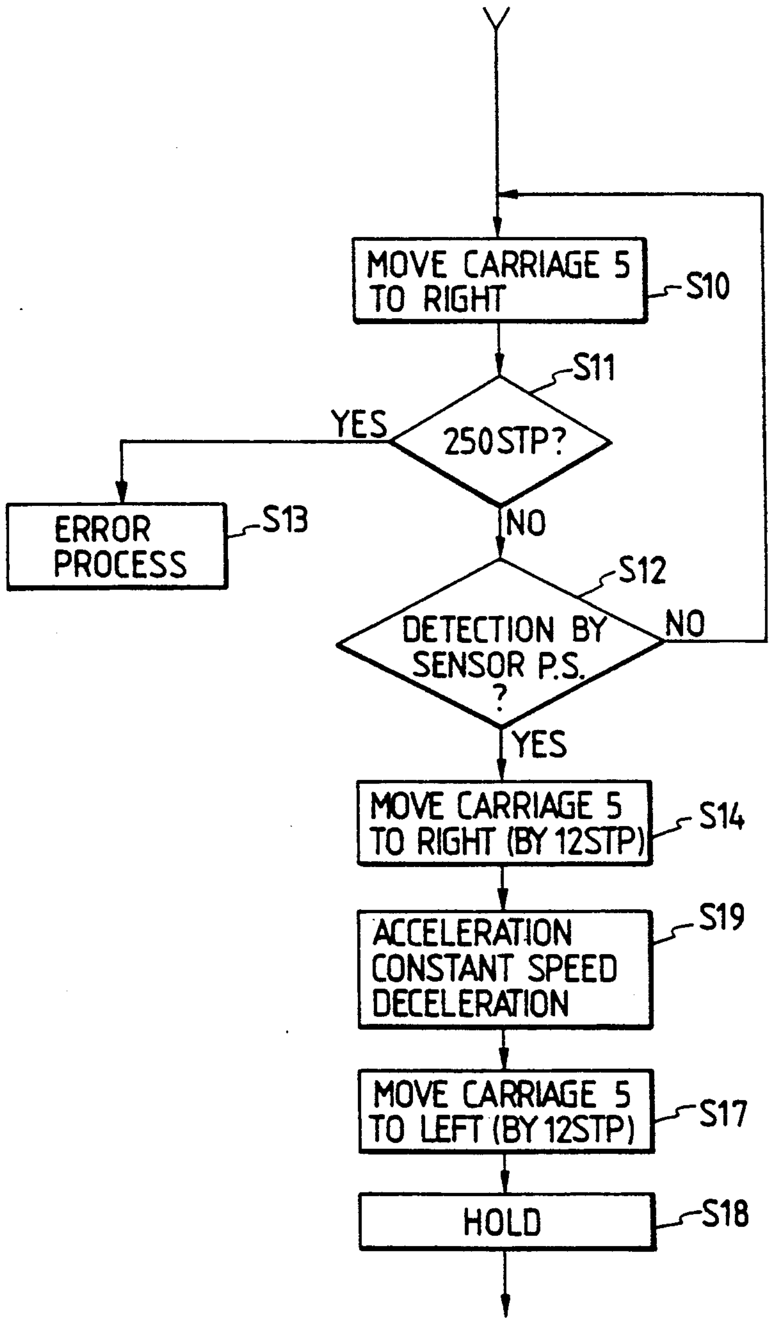

An operation when the sheet detection switch P.S. of a printer R is turned on will be described with reference to FIG. 18

The paper detection switch P.S. is arranged to automatically feed the leading end of a roll 106 to the recording position when the leading end of a new roll 106 is inserted in the printer R. A signal from the paper detection switch P.S. can be directly input to the CPU 110 shown in FIG. 14. When an output from the paper detection switch P.S. is changed from an OFF state (i.e., paper empty state) to an ON state (i.e., paper full state), the CPU 110 operates the printer R in accordance with an operation sequence shown in FIG. 18. The operations in steps S10 to step S14 are the same as those of FIG. 17. Although one-line paper feed is performed (step S15) in FIG. 17, the leading end of the paper is automatically conveyed to the recording position in accordance with the operation sequence shown in FIG. 18. In this embodiment, 13-line paper feed is performed (step S19). Normally, the leading end of paper reaches the recording position by about 10-line paper feed. Thereafter, the carriage 5 is moved to the left (step S17) and is stopped at the software home position SHP (step S18).

According to this embodiment, as has been described above, the carriage driving timing belt has a toothed portion which can be meshed with the driving pulley and a non-toothed portion which is not meshed therewith. When the carriage reaches the return limit position, the non-toothed portion of the timing belt is brought into contact with the driving pulley, thereby idling the driving pulley. The feed roller shaft can be continuously rotated in the sheet feed direction. Therefore, continuous sheet feeding can be performed. When the recording sheet is fed to the recording position, the leading end of the recording sheet is not brought into contact with the recording head. At the time of continuous sheet feeding, the carriage need not be moved, so that low-noise sheet feeding can be performed. In particular, in a liquid spray recording system, degradation of the discharging function caused by an interference between the recording head and the recording sheet can be prevented at low cost.

Another embodiment of the present invention will be described with reference to FIGS. 19 to 26.

In this embodiment, the timing belt is constituted by a two-step timing belt to improve driving and transmission precision.

Figure 19:
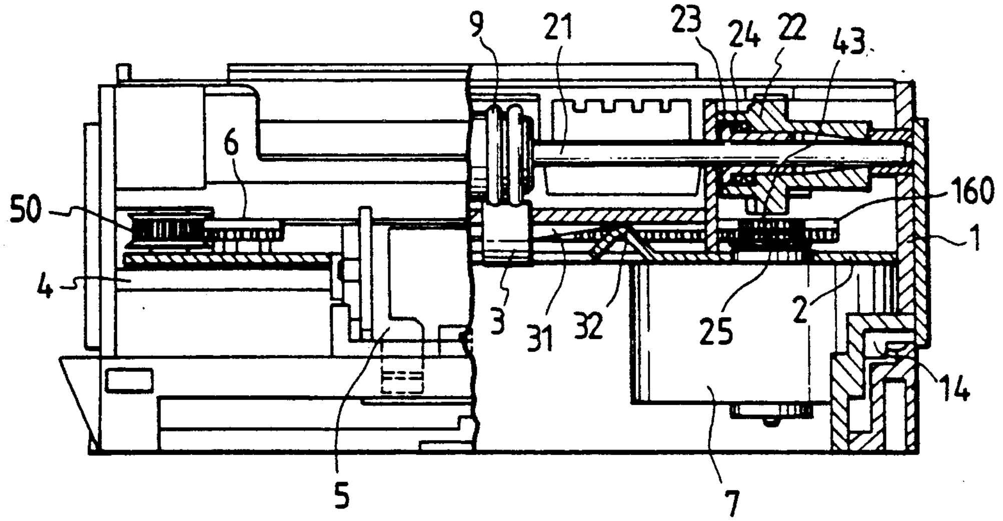
FIG. 19 is a partially cutaway front view of another embodiment of the present invention.
Figure 20:
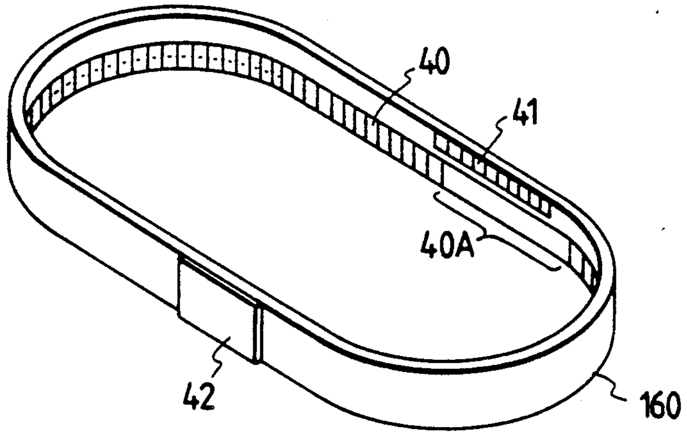
FIG. 20 is a perspective view showing a timing belt of the embodiment shown in FIG. 19.

Driving systems of a timing belt 160 and a feed roller 9 by a stepping motor 7 will be described with reference to FIGS. 19 and 20. A worm wheel 22 is fitted on a feed roller shaft 21 and is meshed with a worm gear 26.

An arbor 23 is fitted and fixed on the feed roller shaft 21. A spring clutch 24 is interposed between the arbor 23 and the worm wheel 22. One end of the spring clutch 24 is locked with a groove (not shown) formed in the worm wheel 22 and is rotated together with the worm wheel 22. When the spring clutch 24 is rotated in the E direction (during recording) upon rotation of the worm gear 26 fixed on a driving shaft 7A of the stepping motor 7, the spring of the clutch 24 is disengaged from the arbor 23. The feed roller 9 and the roller shaft 21 are not rotated. Only when the worm wheel 22 is rotated in the F direction (recording medium feeding), the spring of the spring clutch 24 is engaged with the arbor 23, so that the feed roller 9 and the roller shaft 21 are rotated.

The timing belt 160 has a lower drive toothed portion 40 having a non-toothed portion 40A and an upper trigger toothed portion 41 opposite to the non-toothed portion 40A. In this case, the upper and lower halves are determined with respect to the central line of the belt along its longitudinal direction. A projection 42 locks the carriage 5.

Figure 21:
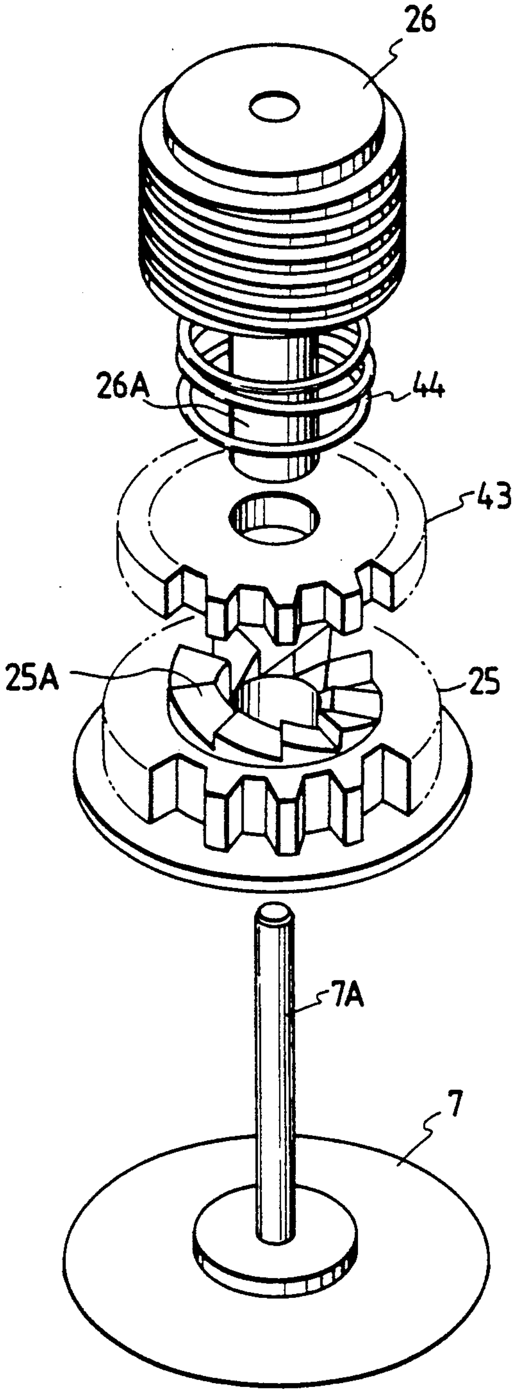
FIG. 21 is an exploded perspective view showing a stepping motor and its transmission/driving system of the embodiment shown in FIG. 19.

FIG. 21 is an exploded perspective view of the stepping motor 7 and a belt driving portion.

Referring to FIG. 21, the worm gear 26 is fixed on the driving shaft 7A of the stepping motor 7. A belt driving pulley 25 includes ratchet teeth 25A on the upper surface of the inner periphery thereof. The belt driving pulley 25 is rotated together with the worm gear 26. A trigger pulley 43 is axially slidable and movable on a shaft 26A of the worm gear 26. The trigger pulley 43 is biased against the ratchet teeth 25A of the belt driving pulley 25 by a ratchet spring 44. When the stepping motor 7 is rotated, the worm gear 26 is rotated together with the belt driving pulley 25. When the worm wheel 22 is rotated by the worm gear 26 in the E direction, the spring clutch 24 slips along the arbor 23, as described above. The roller shaft 21 and the feed roller 9 are not rotated, and the recording medium 11 is not fed. In this case, the carriage 5 is moved in the C direction. Meanwhile, a printing signal is selectively supplied to a recording head through a flexible cable 13 in synchronism with a driving signal for the stepping motor 7, thereby causing recording on a recording medium 11.

When recording is completed, the stepping motor 7 is rotated in the reverse direction, i.e., the B direction to return the carriage 5 in the D direction. The worm wheel 22 is rotated in the F direction, and the spring clutch 24 is engaged with the arbor 23. Therefore, the feed roller shaft 21 is rotated in the F direction, and the recording medium 11 can be fed by the feed roller 9. In other words, the recording medium 11 is fed during returning of the carriage 5, i.e., during non-recording. The recording operation has been described above. An operation for continuously feeding the recording medium 11 will be described below.

In this embodiment, the belt driving pulley 25 is set at a position where it is meshed with the trigger toothed portion 41 formed in the timing belt 160. The ratchet teeth 25A are formed on the belt driving pulley 25 at a position opposite to the trigger pulley 43. Other ratchet teeth 43A are also formed on the trigger pulley 43 at a position opposite to the belt driving pulley 25, so that both ratchet teeth are meshed with each other during rotation in a predetermined direction. A tooth pitch angle of the ratchet teeth 25A and 43A is set to be an integer multiple of the tooth pitch angle of the belt driving pulley 25. The outer diameter of the trigger pulley 43 is set to be smaller than that of the belt driving pulley 25.

An operation of the recording apparatus having the above arrangement will be described below.

In a state prior to recording, a corner 5A of the carriage 5 abuts against a home position sensor 14, as previously described. The stop state of the carriage 5 is detected by the sensor 14. However, when a character-feed signal for moving the carriage 5 is transmitted to the stepping motor 7, the motor 7 is rotated in the A direction. The carriage 5 is moved in the C direction through the belt driving pulley 25 and the timing belt 160, thereby performing recording.

In the state prior to recording, as described above, the corner 5A of the carriage 5 abuts against the sensor 14, and the stop state of the carriage 5 is detected by the sensor 14. In this state, the stepping motor 7 is rotated in the A direction during recording. However, the stepping motor 7 is rotated in the B direction during recording medium feeding. The carriage 5 is kept driven in the D direction, and an end portion 5B of the carriage 5 abuts against the right regulating wall 1B of the frame 1 (FIG. 10), so that the carriage 5 is no longer moved in the D direction.

An interlocking operation of the timing belt 160 and the belt driving pulley 25 will be described below. As described above, the non-toothed portion 40A is formed in the drive toothed portion 40 of the timing belt 160. The position at which the non-toothed portion 40A is formed is determined as a position where the belt driving pulley 25 is disengaged when the end 5B of the carriage 5 abuts against the right regulating wall 1B of the frame 1. In this state, when the stepping motor 7 is kept rotated in the B direction, the timing belt 160 slips on the belt driving pulley 25, so that driving is canceled and a driving power is not transmitted. As described above, since the worm gear 26 causes the worm wheel 22 to rotate in the F direction of FIG. 40, the feed roller 9 is kept rotated and a desired feed amount of the recording medium 11 can be obtained.

An operation of the belt driving pulley 25, the trigger pulley 43, and the ratchet spring 44 will be described with reference to FIGS. 22 and 23.

Figure 22:
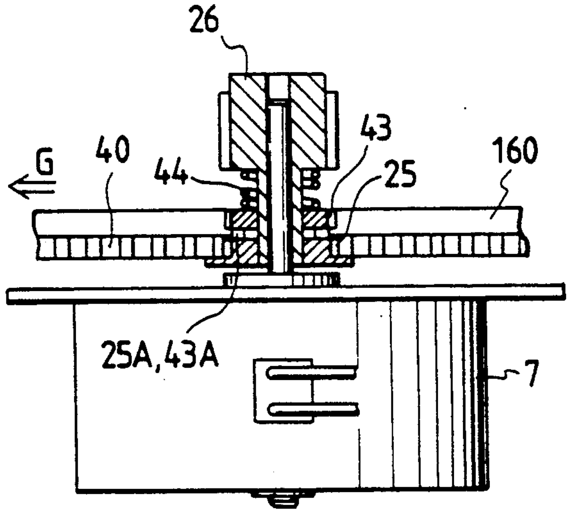
FIGS. 22 and 23 are side sectional views of the embodiment shown in FIG. 21, showing the carriage driven and stop states, respectively.

FIG. 22 is a sectional view of the driving pulley when the stepping motor 7 is kept rotated in the B direction, i.e., the carriage 5 is kept moved in the D direction. The belt driving pulley 25 is kept meshed with the drive toothed portion 40 formed on the timing belt 160. The timing belt 160 is kept driven in the G direction. At this time, since the trigger toothed portion 41 is not formed on the trigger pulley 43 at a position opposite to the timing belt 160, no meshing is established. The ratchet teeth 25A formed on the belt driving pulley 25 and the ratchet teeth 43A formed on the trigger pulley 43 are urged against the ratchet spring 44, so that a meshed state is established.

Figure 23:
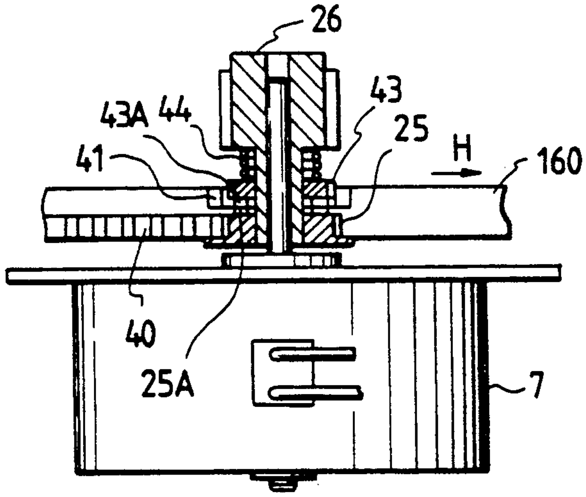

FIG. 23 is a sectional view of the driving pulley when the end 5B of the carriage 5 abuts against the right regulating wall IB of the frame 1. The teeth of the belt driving pulley 25 are disengaged from the drive toothed portion 40 of the timing belt 6, so that these members are held in a slip state. At the same time, the trigger pulley 43 is kept meshed with the trigger toothed portion 41 of the timing belt 160.

In this state, when the stepping motor 7 is kept rotated, the trigger pulley 43 is meshed with the trigger toothed portion 41 of the timing belt 160 and is locked in the rotational direction. For this reason, the ratchet teeth 25A of the belt driving pulley 25 are disengaged from the ratchet teeth 43A and the trigger pulley 43 is moved against the ratchet spring 44. Therefore, only the belt driving pulley 25 is idled while slipping on the timing belt 160. When this idling continues, the recording medium can be fed by a predetermined amount.

When the recording medium 11 is fed by a predetermined amount, the stepping motor 7 is rotated in the reverse direction (A direction in FIG. 10) in order to return the carriage 5 to the state prior to recording. The ratchet teeth 25A and 43A are meshed with each other, and a rotational force of the belt driving pulley 25 is transmitted to the trigger pulley 43. Upon meshing between the trigger toothed portion 41 and the trigger pulley 43, the timing belt 160 is driven in the H direction in FIG. 23. When the timing belt 160 is driven by the trigger pulley 43 by a predetermined amount, the state of the belt driving pulley 25 is changed from the slip state to the meshed state with the drive toothed portion 40. Therefore, the belt driving pulley 25 directly drives the timing belt 160.

Figure 24:
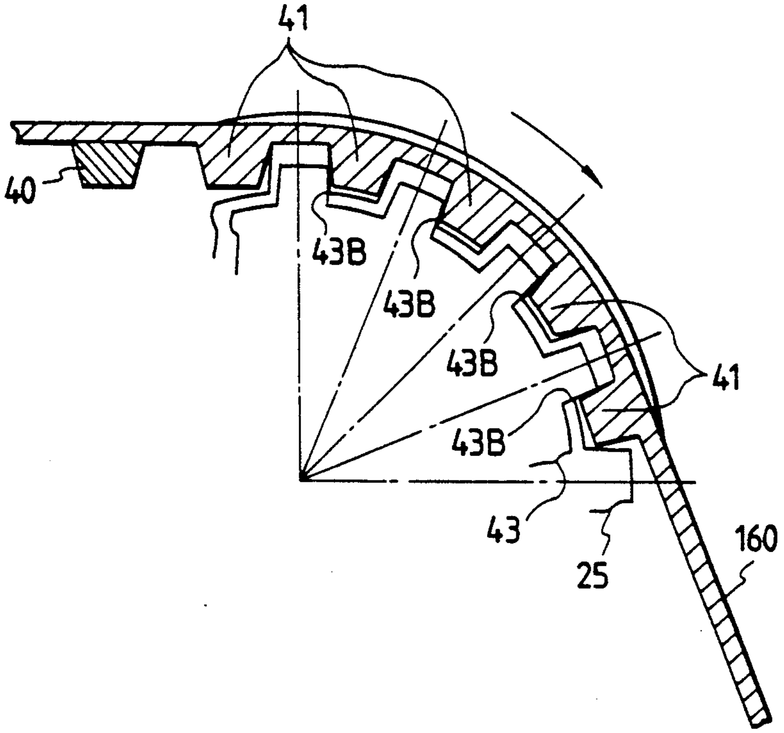
FIG. 24 is a sectional view showing a state wherein a trigger pulley is meshed with trigger teeth.

FIG. 24 is an enlarged view for explaining meshing between the trigger pulley 43 and the trigger toothed portion 41 in detail.

Referring to FIG. 24, the timing belt 160 slips on the belt driving pulley 25. The toothed portion of the trigger pulley 43 is meshed with the trigger toothed portion 41 on the timing belt 160. More specifically, the trigger toothed portion 41 is meshed with a portion 43B of the trigger pulley 43. As previously described, the outer diameter of the belt driving pulley 25 is set to be slightly smaller than that of the trigger pulley 43, and the thickness of the belt driving pulley 25 is set to be slightly smaller than that of the trigger pulley 43. In practice, therefore, the belt driving pulley 25 is brought into contact with timing belt 160 only at the contact portion 43B. When the ratchet teeth 25A and 43A formed on the mating surfaces of the belt driving pulley 25 and the trigger pulley 43 are disengaged from each other, a frictional force generated by vertical movement of the trigger pulley in the axial direction can be reduced, thereby achieving a smooth operation.

Figure 25:
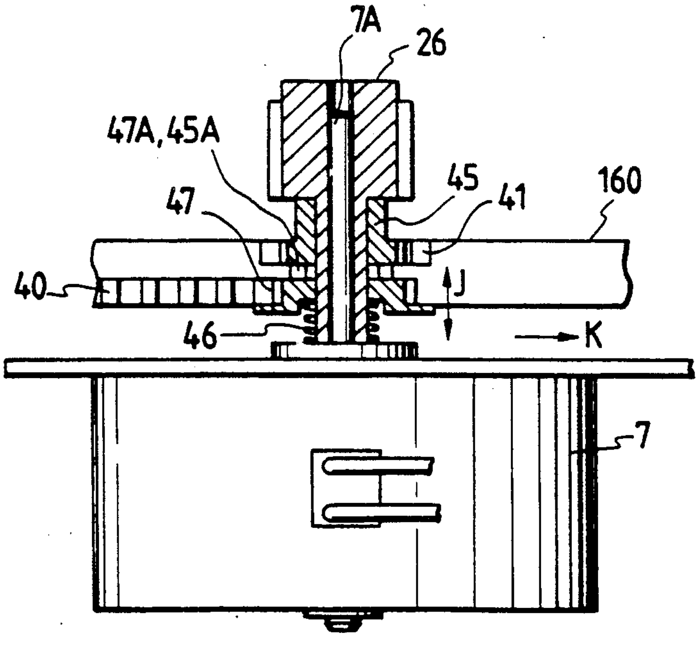
FIG. 25 is a sectional view showing a modification of the driving pulley shown in FIG. 19.

FIG. 25 shows a modification of the embodiment described with reference to FIGS. 19 to 24.

The worm gear 26 is fixed on the driving shaft 7A of the stepping motor 7. A belt driving pulley 47 is fitted on a shaft portion of the worm gear 26 and is slidable in the J direction in FIG. 25. However, movement of the belt driving pulley 47 is restricted in the rotational direction. The belt driving pulley 47 is rotated together with the worm gear 26. A trigger pulley 45 is rotatably supported on the shaft of the worm gear 26. Ratchet teeth 47A and 45A are formed at opposite portions of the belt driving pulley 47 and the trigger pulley 45 in the same manner as the above embodiment. The belt driving pulley 47 is always biased by a ratchet spring 46 toward the trigger pulley 45.

An operation of this modification will be described below.

FIG. 25 corresponds to FIG. 23 of the above embodiment. The belt driving pulley 47 and the timing belt 160 are kept in a slip state. At this time, when the stepping motor 7 is rotated, the belt driving pulley 47 tends to be rotated together with the trigger pulley 45. However, the trigger pulley 45 is meshed with the trigger toothed portion 41 formed on the timing belt. Therefore, the belt driving pulley 47 is idled moving against the biasing force of the ratchet spring 46 since the ratchet teeth 47A and 45A are disengaged from each other.

When the stepping motor 7 is rotated in the reverse direction in order to return the carriage 5 to the recording start position, the ratchet teeth 47A and 45A are meshed with each other. The trigger pulley 45 is rotated, and then the timing belt 160 is driven in the K direction. When the timing belt 160 is driven by a predetermined amount, the belt driving pulley 47 is meshed with the drive toothed portion 40 again from a slip state. The timing belt 160 is directly driven by the belt driving pulley 47.

In this manner, the arrangement of this modification can be operated in the same manner as in the above embodiment.

Figure 26:
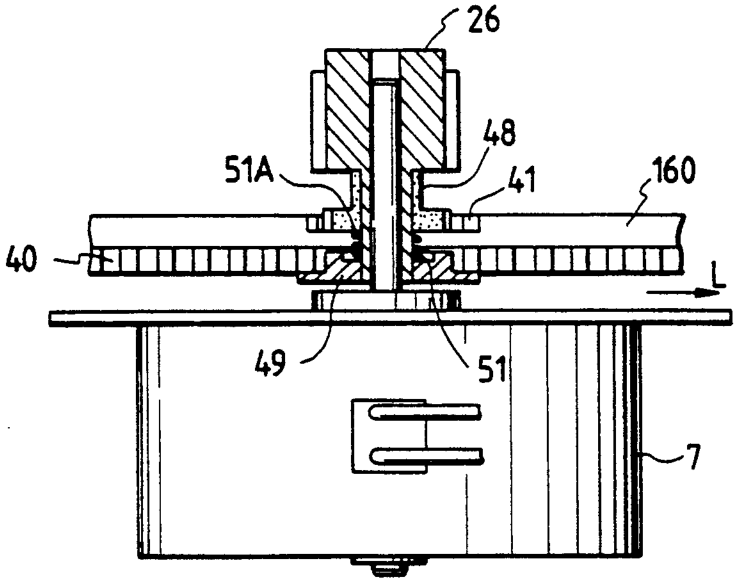
FIG. 26 is a sectional view showing another modification of the driving pulley shown in FIG. 19.

FIG. 26 shows another modification of the above embodiment.

The worm gear 26 is fixed on the rotating shaft of the stepping motor 7. A belt driving pulley 49 is fitted on the shaft of the worm gear 26 and is rotated together with it. A trigger pulley 48 is fitted on the shaft of the worm gear 26 and is rotatably supported thereon. One end portion 51A of a clutch spring 51 is fixed to the trigger pulley 48. The inner surface of the trigger pulley 48 abuts against the outer surface of the shaft of the worm gear 26. Rotation of the worm gear 26 is transmitted to the trigger pulley 48.

FIG. 26 corresponds to FIG. 23 of the above embodiment. The belt driving pulley 49 and the timing belt 160 are kept in a slip state. At this time, the shaft of the worm gear 26 and the clutch spring 51 are also kept in a slip state. Since the trigger pulley 48 is meshed with the trigger toothed portion 41 formed on the timing belt 160, it is locked. Therefore, the rotational force of the stepping motor 7 is not transmitted to the trigger pulley 48.

When the stepping motor 7 is rotated in the reverse direction to return the carriage 5 to the recording start position, the shaft of the worm gear 26 can be connected to the clutch spring 51. The trigger pulley 48 is driven, and the timing belt 6 is driven in the L direction. When the timing belt 6 is driven by a predetermined amount, the belt driving pulley 49 and the drive toothed portion 40 are meshed again from a slip state. The timing belt 160 is directly driven by the belt driving pulley 49 in the same manner as in the above embodiment and its first modification.

According to this embodiment and its modifications, since the timing belt is arranged as a two-step timing belt, the driving force can be accurately transmitted.

Other embodiments will be described with reference to FIGS. 27 to 30.

The following embodiments are suitable for changing a recording area.

Figure 27:
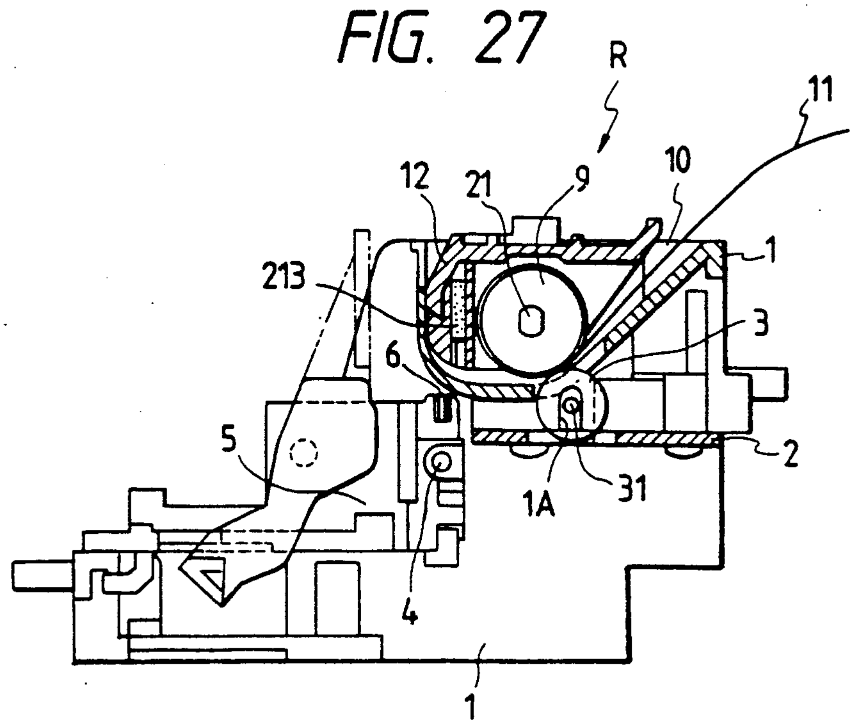
FIG. 27 is a side sectional view showing still another embodiment of the present invention.

FIG. 27 is a partially cutaway side sectional view of a recording system or printer R which employs the present invention. A platen 12 for holding a recording sheet 11 at a recording position is held above a feed roller 9. An ink absorbing member 213 is housed in the platen 12, as shown in FIG. 27. As is apparent from the operation of each embodiment described above, the worm gear 26 and the worm wheel 22 are rotated through a predetermined angle within a predetermined operating range of the carriage 5, thereby performing constant sheet feed. The sheet feed amount is determined in the design stage of the worm gear 26 and the worm wheel 22.

In order to widen a printing width to print a larger number of characters, a character size, and especially a character height, are already determined by a recording head. When a printing width is increased, a moving width in the return stroke is increased, that is, the rotational angle of the worm wheel 22 is increased. In other words, a sheet feed pitch is increased. In general, when the sheet feed pitch is increased with respect to the character size, the printed result seems to be elongated in the widthwise direction, and hence the printing sheets are wasted. When a groove 22*a* (FIGS. 28 and 29) which receives one end of the spring clutch 24 of the worm wheel 22 is widened, the play amount of the spring clutch 24 is increased, and therefore the sheet feed amount can be reduced.

Figure 28:
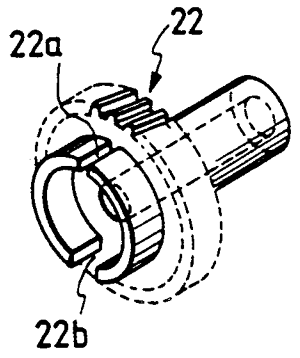
FIGS. 28 and 30 are perspective views of a worm wheel.

FIG. 28 is a perspective view of a worm wheel according to the present invention. One groove 22*a* of the worm wheel 22 is a groove for receiving one end of the spring clutch 24 with respect to the printing width determined at the time of design. The other groove 22*b* is a groove for receiving one end of the spring clutch 24 when the recording apparatus is used for a wider printing width.

In this embodiment, the two grooves 22*a* and 22*b* are formed at equal angular intervals, i.e., 180° apart from each other.

Figure 29:
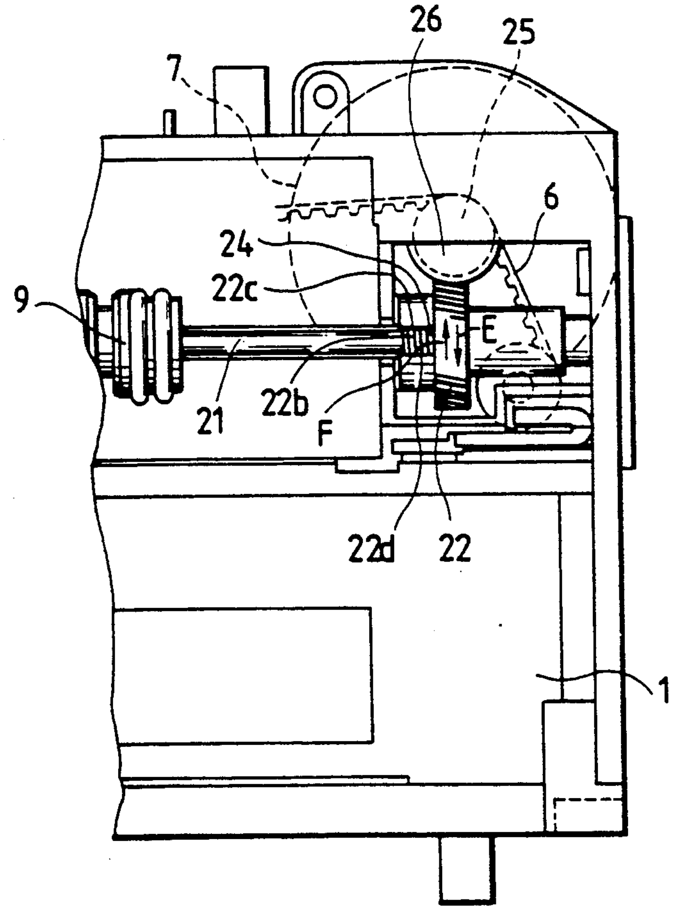
FIG. 29 is a plan view showing the main part of still another embodiment of the present invention.

FIG. 29 shows the worm wheel 22 and the spring clutch 24 according to the present invention. During printing, the worm wheel 22 is rotated in the E direction, and the spring clutch 24 abuts against an end portion 22*c* of the groove 22*b* of the worm wheel 22. The spring clutch 24 is rotated together with the worm wheel 22. As described above, the spring clutch 24 does not transmit a driving force to the roller shaft 21. However, in the return path, the spring clutch 24 is idled from the end portion 22*c* of the groove 22*b* of the worm wheel 22 to the other end portion 22*d* of the groove 22*b*. The spring clutch 24 abuts against the end portion 22*d* and is rotated together with the worm wheel 22, and the above-mentioned paper feeding can be performed. Therefore, a sheet feed amount can be reduced by an idling angle. That is, the sheet feed amount can be arbitrarily reduced by the width of the groove 22*b* of the worm wheel 22. An increase in sheet feed amount caused by an increase in printing width can be adjusted.

Figure 30:
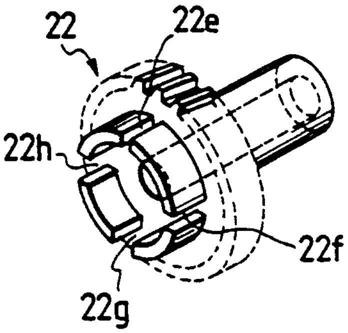

FIG. 30 shows still another embodiment in which four grooves 22*e* to 22*h* are formed in a worm wheel 22 at equal angular intervals so as to cope with four different printing widths. In this manner, when grooves having different printing widths are formed in the worm wheel, the printing apparatus can cope with different printing widths.

According to the recording apparatus of the above embodiments, a plurality of grooves for receiving one end of the spring clutch are formed in the spring clutch holding means and these grooves have different widths. For this reason, the play amount of the spring clutch can be changed. Even if the printing width is changed, the components need not be replaced, and the feed amount of the recording medium can be kept constant. Therefore, the cost of molds for forming other components and component cost can be saved, thereby decreasing the component cost and improving the management.

Other embodiments of the present invention will be described with reference to FIGS. 31A to 32B.

In these embodiments, the embodiment (FIG. 27) having the absorbing member is further exemplified.

In these embodiments, a printing surface of a platen has a rib-like structure, and an absorbing means for absorbing an unnecessary ink is provided between the ribs. When a recording medium such as a recording sheet is not loaded in the recording apparatus and an erroneous printing operation is performed, ink scattering and contamination of the recording medium can be prevented, and the apparatus will not be adversely affected.

Figure 31A:
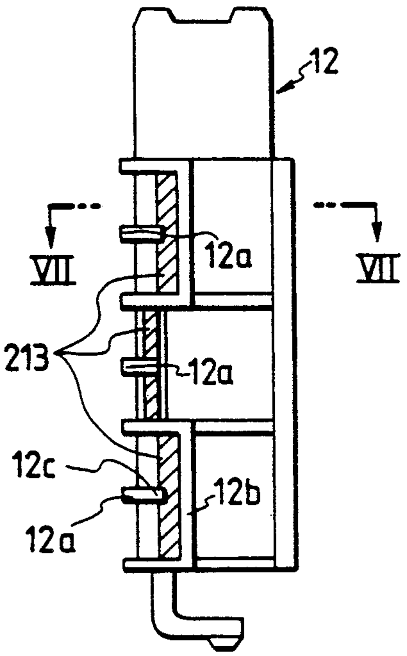
FIG. 31A is a rear view of a platen which employs the present invention.
Figure 31B:
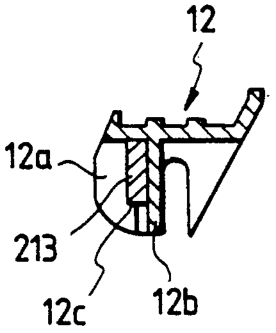
FIG. 31B is a sectional view of the arrangement shown in FIG. 31A when taken along the line VII—VII of FIG. 31A.

FIGS. 31A and 31B show a platen. An ink absorbing member 213 (e.g., made of a porous material such as sponge) is arranged between ribs 12*a*. Since the printing surface of the platen 12 is brought into contact with the printing sheet, the surface of the ink absorbing member 213 is deeper than the printing surface of the rib 12*a* of the platen 12. There are provided a back plate 12*b* of the rib 12*a* of the platen 12 and a pawl 12*c* for fixing the ink absorbing member 213. The ink absorbing member 213 is clamped between the rib 12*a* and the back plate 12*b*.

Figure 32A:
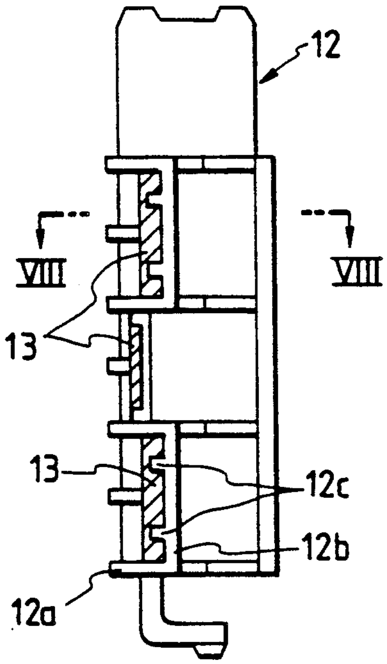
FIG. 32A is a rear view of a platen which employs the present invention.
Figure 32B:
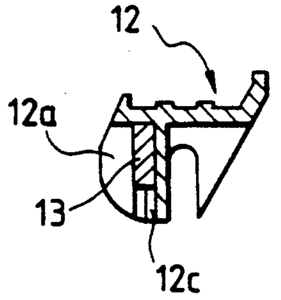
FIG. 32B is a sectional view of the arrangement shown in FIG. 32A when taken along the line VIII—VIII of FIG. 32A.

In a platen 12 shown in FIGS. 32A and 32B, a pawl 12*c* for fixing an ink absorbing member 213 may be arranged not on the rib 12*a* side but on the back plate 12*b* side.

Each embodiment described above exemplifies an ink-jet recording scheme wherein a change in state of an ink liquid is generated by heat, and the ink liquid is discharged as ink droplets through a discharge port on the basis of the change in state, or a bubble jet recording scheme wherein a bubble is generated by heat in an ink liquid, and an ink liquid is discharged as ink droplets from the discharge port by a bubble pressure. However, the present invention is not limited to this scheme. The present invention is applicable to a known recording scheme such as a thermal recording scheme or an impact recording scheme. Therefore, the recording means include an ink-jet head, a thermal head, a daisy wheel, and a wire dot.

As has been described above, according to the present invention, there is provided a recording apparatus capable of shortening a recording time.

What is claimed is:

1. A recording apparatus for performing recording on a recording medium, comprising:

feeding means for feeding a recording medium;

recording means reciprocally movable along a feed path of the recording medium conveyed by said feeding means, said recording means being arranged to perform recording on the recording medium;

a drive source rotatable in a forward and a reverse direction for generating a driving force;

first driving force transmitting means for driving said feeding means upon rotation of said drive source; and second driving force transmitting means capable of not receiving the driving force when the driving force is transmitted from said drive source to said first driving force transmitting means, said second driving force transmitting means being arranged to reciprocate said recording means upon forward and reverse rotation of said drive source, wherein said second driving force transmitting means comprises a belt driving pulley and a timing belt, said timing belt having a toothed portion for receiving the driving force from said belt driving pulley and a non-toothed portion which slips on said belt driving pulley.

2. An apparatus according to claim 1, wherein said first driving force transmitting means comprises a worm gear and a worm wheel.

3. An apparatus according to claim 1, wherein said timing belt has a double width, and said toothed portion for receiving the driving force from said belt driving pulley is formed parallel to said non-toothed portion which is adapted to slip on said belt driving pulley, and another toothed portion is formed opposite to said non-toothed portion in a widthwise direction of said timing belt.

4. An apparatus according to claim 1, wherein said timing belt is locked with a reciprocal carriage.

5. An apparatus according to claim 1, wherein said drive source comprises a stepping motor.

6. An apparatus according to claim 1, wherein said feeding means comprises a roller pair.

7. An apparatus according to claim 1, wherein said recording means comprises an ink-jet head for performing recording on the recording medium upon discharging of an ink liquid.

8. An apparatus according to claim 1, wherein said recording apparatus is an electronic portable calculator.

9. A recording apparatus according to claim 1, wherein said recording means has a bubble jet recording head for discharging ink by utilizing thermal energy.

10. A recording apparatus for performing recording on a recording medium, comprising:

a platen;

an ink-jet head, reciprocally movable along said platen, for discharging an ink liquid to perform recording on the recording medium;

a motor rotatable in a forward and a reverse direction;

first driving force transmitting means for rotating a roller upon rotation of said motor; and second driving force transmitting means comprising a belt driving pulley and a timing belt, said timing belt having a toothed portion for receiving the driving force from said belt driving pulley and a non-toothed portion which slips on said belt driving pulley, said second driving force transmitting means for inhibiting reception of a driving force through slippage of said timing belt on said belt driving pulley when a driving force is transmitted from said motor to said first driving force transmitting means, for causing said ink-jet head to move along a forward path upon forward rotation of said motor and for causing said ink-jet head to move along a reverse path upon reverse rotation of said motor when said ink-jet head is reciprocated.

11. An apparatus according to claim 10, wherein said first driving force transmitting means comprises a worm gear and a worm wheel.

12. An apparatus according to claim 10, further comprising a liquid ink absorbing member for absorbing liquid ink in a recess of said platen.

13. An apparatus according to claim 10, wherein said recording apparatus is an electronic portable calculator.

14. An apparatus according to claim 10, wherein said timing belt is locked with a reciprocal carriage.

15. A recording apparatus according to claim 10, wherein said ink-jet head is a bubble jet recording head for discharging ink by utilizing thermal energy.

16. An apparatus according to claim 10, wherein said timing belt has a double width and said toothed portion for receiving the driving force from said belt driving pulley is formed parallel to said non-toothed portion which is adapted to slip on said belt driving pulley, and another toothed portion is formed opposite to said non-toothed portion in a widthwise direction of said timing belt.

17. A recording apparatus comprising:

clutch means, arranged in association with roller shaft driving means for rotating a feed roller shaft by rotatably engaging said feed roller shaft only in a sheet feed direction;

a reciprocally movable carriage, mounted with a recording head, for causing said recording head to perform recording in a forward path; and a drive source rotatable in a forward and a reverse direction for simultaneously driving a driving pulley for driving a timing belt of said carriage and said roller shaft driving means, said feed roller shaft being not driven by said clutch means when said carriage is moved along the forward path through said driving pulley and said timing belt upon forward rotation of said drive source, and said feed roller shaft being rotated by said clutch means in the sheet feed direction when said carriage is moved along a return path through said driving pulley and said timing belt upon reverse rotation of said drive source, said timing belt being provided with a toothed portion capable of being meshed with said driving pulley and a non-toothed portion incapable of being meshed with said driving pulley, said non-toothed portion of said timing belt being brought into contact with said driving pulley to idle said driving pulley when said carriage is guided to a return limit position, to thereby enable continuous rotation of said feed roller shaft in the sheet feed direction.

18. A recording apparatus according to claim 17, wherein said recording head includes a bubble jet recording head for discharging ink by utilizing thermal energy.

19. A recording apparatus comprising:

a recording head reciprocated through forward and reverse rotation of a driving shaft by a timing belt means driven by a belt driving pulley mounted on said driving shaft of a single drive source, wherein said timing belt comprises a toothed portion for receiving the driving force from said belt driving pulley and a non-toothed portion which slips on said belt driving pulley;

recording medium feed means driven only when said driving shaft is rotated in a reverse direction; and driving force canceling means, arranged in said driving shaft, said belt driving pulley, and said timing belt means, for canceling transmission of a driving force to said timing belt means after movement of said recording head by a predetermined amount during reverse rotation of said driving shaft.

20. A recording apparatus according to claim 19, wherein said recording head includes a bubble jet recording head for discharging ink by utilizing thermal energy.

* * * * *

UNITED STATES PATENT AND TRADEMARK OFFICE

CERTIFICATE OF CORRECTION

PATENT NO. : 5,136,308

DATED : August 4, 1992

INVENTOR(S) : YASUHIDE SAITO, ET AL.

It is certified that error appears in the above-identified patent and that said Letters Patent is hereby corrected as shown below:

On title page,

IN [30] FOREIGN APPLICATION PRIORITY DATA

"Aug. 18, 1988 [JP] Japan ............. 1-211444" should read --Aug. 18, 1989 [JP] Japan ................1-211444--.

COLUMN 4

Figure 1:
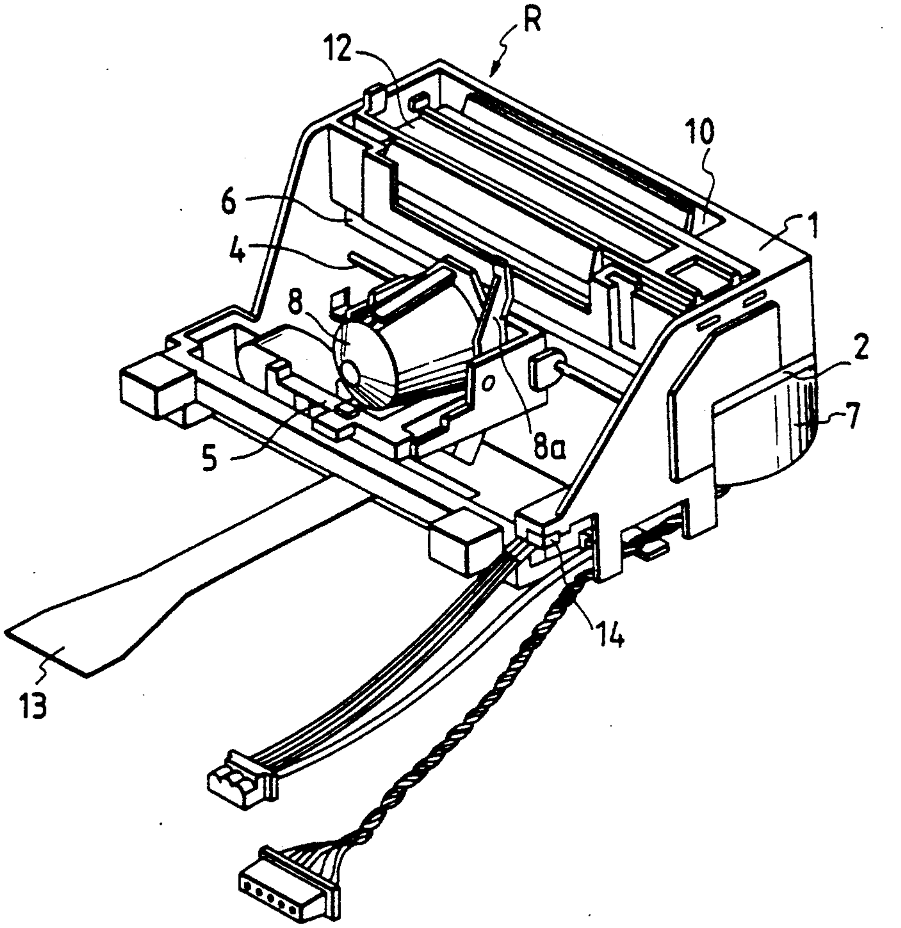
FIG. 1 PRIOR ART
FIG. 1 is a perspective view showing a schematic arrangement of a conventional printing apparatus.
Figure 2:
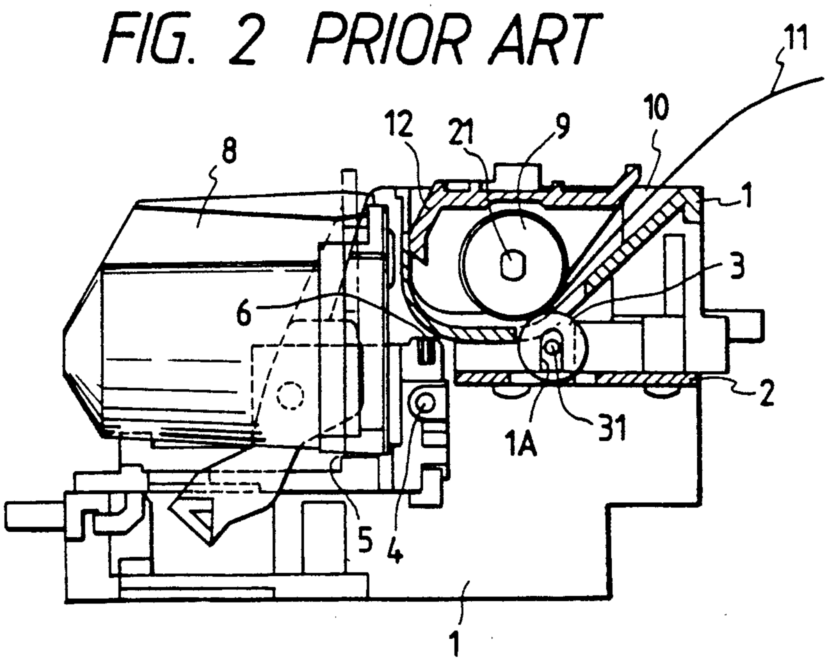
FIG. 2 PRIOR ART
FIG. 2 is a side sectional view showing part of the recording apparatus shown in FIG. 1.
Figure 3:
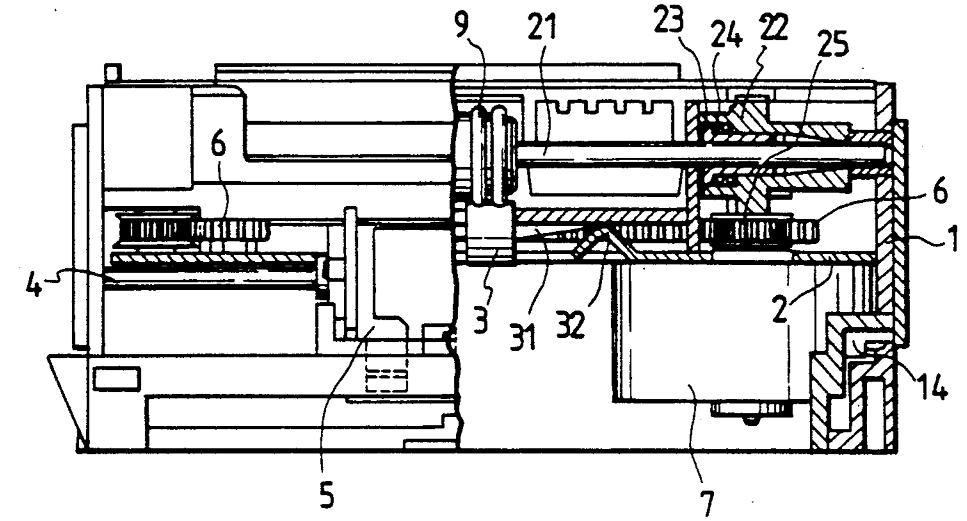
FIG. 3 PRIOR ART
FIG. 3 is a partially cutaway front view of the recording apparatus shown in FIG. 1.
Figure 4:
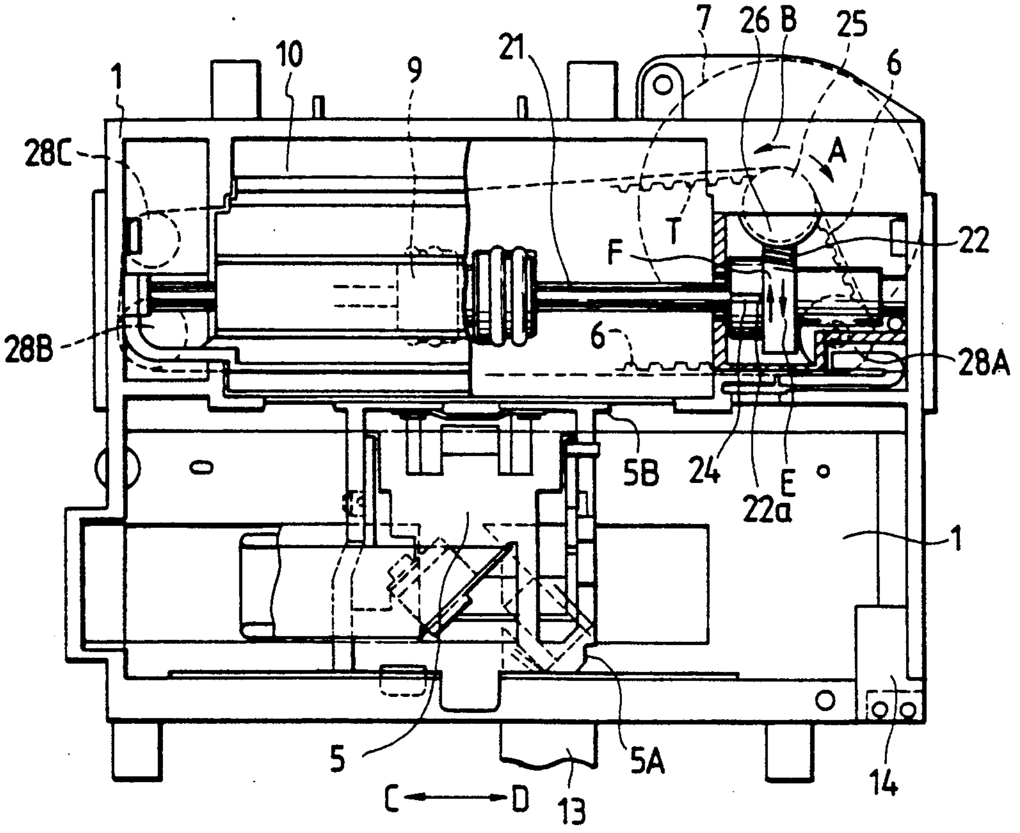
FIG. 4 PRIOR ART
FIG. 4 is a plan view of the recording apparatus shown in FIG. 1.
Figure 5:
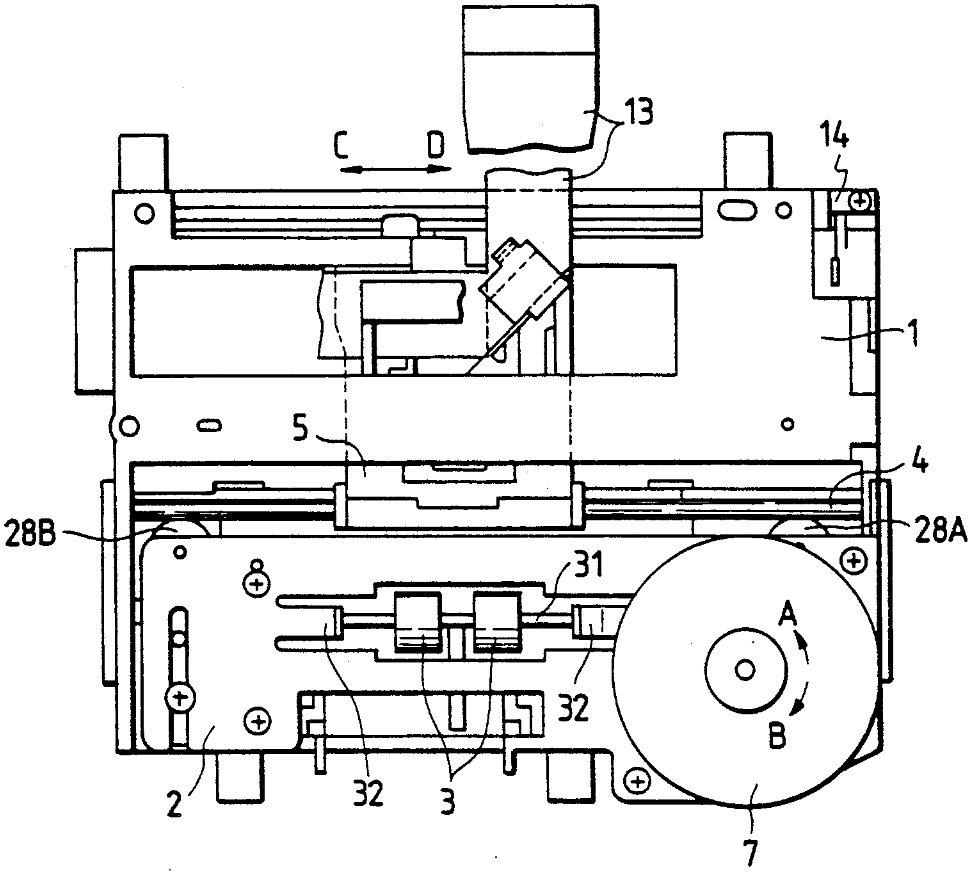
FIG. 5 PRIOR ART
FIG. 5 is a rear view of the recording apparatus shown in FIG. 3.
Figure 6:
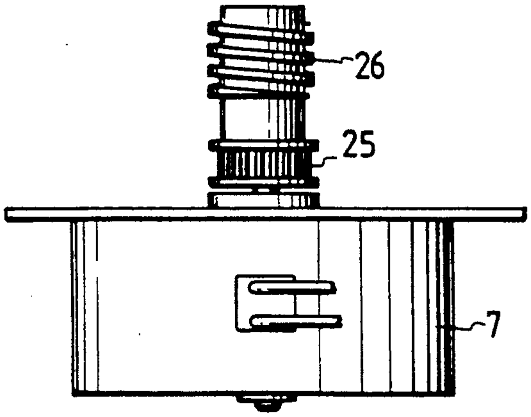
FIG. 6 PRIOR ART
FIG. 6 is a side view of a stepping motor and its driving system of the conventional recording apparatus.

Line 2, "FIG. 1:" should read --FIG. 1;--.

COLUMN 5

Line 62, "16th teeth" should read --16th tooth--.

Signed and Sealed this

Fourteenth Day of September, 1993

Attest:

BRUCE LEHMAN

*Attesting Officer* *Commissioner of Patents and Trademarks*